United States Patent
Lee et al.

(10) Patent No.: US 12,416,809 B2
(45) Date of Patent: Sep. 16, 2025

(54) HEAD-MOUNTED DISPLAY DEVICE

(71) Applicant: Samsung Display Co., LTD., Yongin-si (KR)

(72) Inventors: Cheon Myeong Lee, Yongin-si (KR); Sang-Ho Kim, Yongin-si (KR); Soo Min Baek, Yongin-si (KR); Ju Youn Son, Yongin-si (KR); Ji Won Lee, Yongin-si (KR); Bekhyun Lim, Yongin-si (KR); Ju Hwa Ha, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/630,027

(22) Filed: Apr. 9, 2024

(65) Prior Publication Data
US 2024/0393592 A1 Nov. 28, 2024

(30) Foreign Application Priority Data
May 22, 2023 (KR) .................. 10-2023-0065763

(51) Int. Cl.
*G02B 27/01* (2006.01)
*G02B 27/28* (2006.01)

(52) U.S. Cl.
CPC ....... *G02B 27/0172* (2013.01); *G02B 27/283* (2013.01); *G02B 2027/0118* (2013.01); *G02B 2027/013* (2013.01)

(58) Field of Classification Search
None
See application file for complete search history.

(56) References Cited

U.S. PATENT DOCUMENTS

| | | |
|---|---|---|
| 8,125,143 B2 | 2/2012 | Park et al. |
| 2019/0377176 A1 | 12/2019 | Sharp |
| 2021/0036264 A1 | 2/2021 | Hu et al. |
| 2021/0341798 A1 | 11/2021 | Woodgate et al. |
| 2024/0107143 A1 | 3/2024 | Lee et al. |
| 2024/0201495 A1* | 6/2024 | Ouderkirk ............ G02B 25/001 |

FOREIGN PATENT DOCUMENTS

| | | |
|---|---|---|
| CN | 212623552 U | 2/2021 |
| KR | 20170022047 A | 3/2017 |
| KR | 1020240041419 A | 4/2024 |

* cited by examiner

*Primary Examiner* — Brian M Butcher
(74) *Attorney, Agent, or Firm* — CANTOR COLBURN LLP

(57) ABSTRACT

A head-mounted display device includes a display panel and an optical system positioned on a front surface of the display panel, wherein the display panel sequentially includes a light emitting element unit, a retarder positioned on a front surface of the light emitting element unit, a reflective polarizer, and an absorptive polarizer, wherein the optical system includes a first curved lens configured to include a first retarder positioned on an inner surface and a beam splitter positioned on an outer surface and a second curved lens configured to include a second retarder positioned on an inner surface and a reflective polarizer positioned on an outer surface, wherein the first curved lens is positioned on the display panel, and the second curved lens is positioned on the first curved lens, and wherein the absorptive polarizer of the display panel includes an open portion from which the absorptive polarizer is removed.

20 Claims, 20 Drawing Sheets

HEAD-MOUNTED DISPLAY DEVICE

This application claims priority to Korean Patent Application No. 10-2023-0065763, filed on May 22, 2023, and all the benefits accruing therefrom under 35 U.S.C. § 119, the content of which in its entirety is herein incorporated by reference.

BACKGROUND (a) Field

The present invention relates to a head-mounted display device, and more particularly, to a head-mounted display device having improved light efficiency.

(b) Description of the Related Art

An emissive display device is a self-emitting display device that displays an image by emitting light from a light emitting diode.

Such an emissive display device is included in various electronic devices and has recently been used to provide a three-dimensional effect or immersion to a user, a head-mounted display device that is positioned directly in front of eyes of the user and displays an image is also widely used.

The head-mounted display device has a disadvantage in that its light efficiency is low because a polarizer is used.

SUMMARY

Embodiments provide a head-mounted display device having improved light efficiency.

An embodiment of the present invention provides a head-mounted display device including a display panel and an optical system positioned on a front surface of the display panel, wherein the display panel sequentially includes a light emitting element unit, a retarder positioned on a front surface of the light emitting element unit, a reflective polarizer, and an absorptive polarizer, wherein the optical system includes a first curved lens configured to include a first retarder positioned on an inner surface and a beam splitter positioned on an outer surface and a second curved lens configured to include a second retarder positioned on an inner surface and a reflective polarizer positioned on an outer surface, wherein the first curved lens is positioned on the display panel, and wherein the second curved lens is positioned on the first curved lens, and wherein the absorptive polarizer of the display panel includes an open portion from which the absorptive polarizer is removed.

In an embodiment, the open portion of the absorptive polarizer may have an area of about 1/10 or more and about 1/9 or less of the total area of the absorptive polarizer or the area of the display panel.

In an embodiment, a central axis of the first curved lens or the second curved lens may extend through the open portion and a user's eyes.

In an embodiment, when a region formed by extending a boundary line of the open portion of the absorptive polarizer in a direction parallel to the central axis is referred to as an open portion corresponding region, at least one portion of the user's eyes may be positioned within the open portion corresponding region.

In an embodiment, a boundary line of the open portion corresponding region may have an angle that is greater than about 0 degrees and less than about 5 degrees with respect to the central axis at a position of the user's eyes.

In an embodiment, the reflective polarizer of the display panel may have a first reflection axis, and reflects polarized light of the first reflection axis, and transmit polarized light perpendicular to the first reflection axis, and the absorptive polarizer of the display panel may have a light absorption axis, and absorbs polarized light of the light absorption axis, and transmit polarized light perpendicular to the light absorption axis.

In an embodiment, the retarder may have a first delay axis, and delay light in a direction of the first delay axis by $\lambda/4$ to change linearly polarized light into circularly polarized light or circularly polarized light into linearly polarized light.

In an embodiment, the light absorption axis and the first reflection axis may have the same direction.

In an embodiment, the reflective polarizer of the second curved lens may have a second reflection axis, and reflects polarized light of the second reflection axis, and transmit polarized light perpendicular to the second reflection axis.

In an embodiment, the first retarder of the first curved lens may have a second delay axis, and delays light in a direction of the second delay axis by $\lambda/4$ to change linearly polarized light into circularly polarized light or circularly polarized light into linearly polarized light, and the second retarder of the second curved lens may have a third delay axis, and delays light in a direction of the third delay axis by $\lambda/4$ to change linearly polarized light into circularly polarized light or circularly polarized light into linearly polarized light.

In an embodiment, the second reflection axis may have the same angle as that of the light absorption axis and the first reflection axis.

In an embodiment, the first delay axis, the second delay axis, and the third delay axis may have an angle of 45 degrees with respect to the light absorption axis and the first reflection axis.

In an embodiment, at least one of the retarder of the display panel, the first retarder of the first curved lens, or the second retarder of the second curved lens may have a reverse wavelength dispersion characteristic.

In an embodiment, the second retarder of the second curved lens may have the reverse wavelength dispersion characteristic, and the first retarder of the first curved lens may have a forward wavelength dispersion characteristic.

In an embodiment, the second retarder of the second curved lens and the first retarder of the first curved lens may have the reverse wavelength dispersion characteristic.

In an embodiment, the beam splitter of the first curved lens may reflect the first half of incident light and transmit the second half of the incident light.

In an embodiment, the light emitting element unit may include an anode, an intermediate layer including an emission layer, and a cathode, and the cathode may reflect half of the incident light from a front side.

In an embodiment, the display panel may further include an encapsulation layer configured to block inflow of moisture or air into the emission layer, and the encapsulation substrate may be positioned above the cathode.

In an embodiment, the encapsulation substrate may be in contact with at least one of the retarder, the reflective polarizer, or the absorptive polarizer.

In an embodiment, the display panel may further include an encapsulation layer configured to block inflow of moisture or air into the emission layer, and the encapsulation layer may include a first encapsulation inorganic layer and a second encapsulation inorganic layer, which are two inorganic encapsulation layers, and an encapsulation organic layer, which is an organic encapsulation layer, and the first encapsulation inorganic layer, the encapsulation organic layer, and the second encapsulation inorganic layer may be sequentially stacked.

According to embodiments, light efficiency of a head-mounted display device is improved by using a reflective polarizer in an optical system and a display panel while using a pancake lens in the optical system.

According to embodiments, light efficiency may be improved by forming an open portion in one portion of an absorptive polarizer such that the absorptive polarizer is not positioned to allow light to be recycled without being absorbed.

BRIEF DESCRIPTION OF THE DRAWINGS

The above and other advantages and features of this disclosure will become more apparent by describing in further detail embodiments thereof with reference to the accompanying drawings, in which.

DETAILED DESCRIPTION

Figure 1:
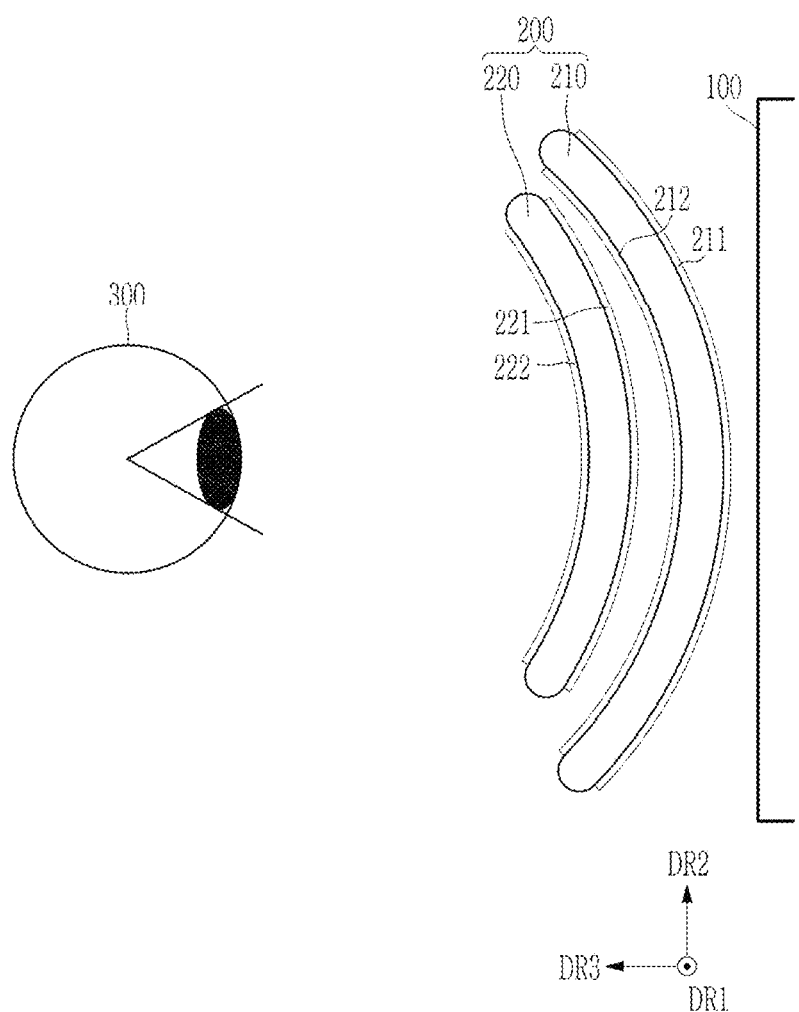
FIG. 1 illustrates a schematic cross-sectional view of a head-mounted display device, according to an embodiment.

The present invention will be described more fully hereinafter with reference to the accompanying drawings, in which embodiments of the invention are shown. As those skilled in the art would realize, the described embodiments may be modified in various ways, all without departing from the spirit or scope of the present invention.

To clearly describe the present invention, parts that are irrelevant to the description are omitted, and like numerals refer to like or similar constituent elements throughout the specification.

Further, although sizes and thicknesses of constituent members shown in the accompanying drawings are arbitrarily given for better understanding and ease of description, the present invention is not limited to the illustrated sizes and thicknesses. In the drawings, the thicknesses of layers, films, panels, regions, etc., are exaggerated for clarity. In the drawings, for better understanding and ease of description, the thicknesses of some layers and areas are exaggerated.

It should be understood that when an element such as a layer, film, region, plate, constituted element, etc. is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion and does not necessarily mean positioned on the upper side of the object portion based on a gravitational direction.

In addition, unless explicitly described to the contrary, the word "comprise" and variations such as "comprises" or "comprising" should be understood to imply the inclusion of stated elements but not the exclusion of any other elements.

Further, throughout the specification, the phrase "in a plan view" means when an object portion is viewed from above, and the phrase "in a cross-sectional view" means when a cross-section taken by vertically cutting an object portion is viewed from the side.

In addition, in the specification, "connected" means not only that two or more components are directly connected, but two or more components may be connected indirectly through other components, physically connected as well as being electrically connected, or it may be referred to by different names depending on the location or function, but may include connecting each of the parts that are substantially integral to each other.

In addition, throughout the specification, when it is said that a portion of a wire, layer, film, region, plate, component, etc., "extends in a first direction or a second direction," this does not indicate only a straight shape extending straight in the corresponding direction, but can indicate a structure that generally extends along the first direction or the second direction, and it may include a structure that is bent at a portion, has a zigzag structure, and/or that extends while including a curved structure.

In addition, an electronic device (e.g., a mobile phone, TV, monitor, or notebook computer) including a display device, a display panel, etc. described in the specification, or an electronic device including a display device and a display panel manufactured by the manufacturing method described in the specification, are not excluded from the scope of the present specification.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, the head-mounted display device according to an embodiment will be described with reference to FIG. 1.

FIG. 1 illustrates a schematic cross-sectional view of the head-mounted display device, according to an embodiment.

The head-mounted display device according to an embodiment includes a display panel 100 (hereinafter also referred to as a display panel for a head-mounted display device) and an optical system 200 positioned in front of the display panel 100. Herein, the optical system 200 may be positioned between the display panel 100 and eyes 300 of a user to make light emitted from the display panel 100 appear wider eyes 300, thereby improving immersion or a three-dimensional effect. Since there is one pair of eyes 300 of a user, one pair of structures illustrated in FIG. 1 may exist in one head-mounted display device.

In an embodiment, the optical system 200 includes two curved lenses 210 and 220 (hereinafter referred to as pancake lenses), and optical films 211, 212, 221 and 222 which are positioned on opposite surfaces of each of the two curved lenses 210 and 220.

The optical system 200 will be described in detail as follows.

In an embodiment, a first retarder 211 (hereinafter also referred to as a first optical system retarder) is formed at a side of the display panel 100 of the first curved lens 210 (hereinafter referred to as a first pancake lens) positioned adjacent to the display panel 100 (in a direction opposite to a third direction DR3, also referred to as an inner side), and a beam splitter 212 is formed on the outside of the first curved lens 210 (side of the third direction DR3). That is, the first curved lens 210 may include the first retarder 211 positioned on an inner surface and the beam splitter 212 positioned on an outer surface.

In an embodiment, the first retarder 211 is also referred to as a λ/4 plate and may change linearly polarized light into circularly polarized light or circularly polarized light into linearly polarized light by providing a retardation of λ/4 with respect to a delay axis. The beam splitter 212 transmits the first half of incident light and reflects the second half and may reflect and transmit light regardless of polarization characteristics of the light.

In an embodiment, a second retarder 221 (hereinafter also referred to as a second optical system retarder) is formed at an inner side of the second curved lens 220 (hereinafter referred to as the second pancake lens) positioned adjacent to the user's eyes 300 and positioned outside the display device (in an opposite direction to the third direction DR3), and a reflective polarizer 222 (hereinafter referred to as an optical system reflective polarizer) is formed at an outer side of the second curved lens 220 (side of the third direction DR3). That is, the second curved lens 220 may include the second retarder 221 positioned on an inner surface and the reflective polarizer 222 positioned on an outer surface.

In an embodiment, the second retarder 221 is also referred to as a λ/4 plate, and may change linearly polarized light into circularly polarized light or circularly polarized light into linearly polarized light by providing a retardation of λ/4 with respect to a delay axis. The reflective polarizer 222 has a reflection axis, and reflects linearly polarized light on the reflection axis, and transmits linearly polarized light perpendicular to the reflection axis. The reflective polarizer 222 may have a wire grid structure in which a plurality of metal lines having fine widths are arranged in one direction and may reflect light parallel to an arrangement direction of the metal lines and may transmit light perpendicular thereto. In this case, an interval between the metal lines may be narrower than a wavelength of visible light.

In an embodiment, the first curved lens 210 and the second curved lens 220 included in the optical system 200 may be formed of an optically isotropic material, such as glass and/or polymethyl methacrylate (PMMA). In addition, curved surfaces of the first curved lens 210 and the second curved lens 220 may be spherical or aspheric. Cross-sectional shapes of the first curved lens 210 and the second curved lens 220 may have different shapes from those of FIG. 1.

Hereinafter, the display panel for the head-mounted display device, according to an embodiment, will be described with reference to FIG. 2 and FIG. 3.

Figure 2:
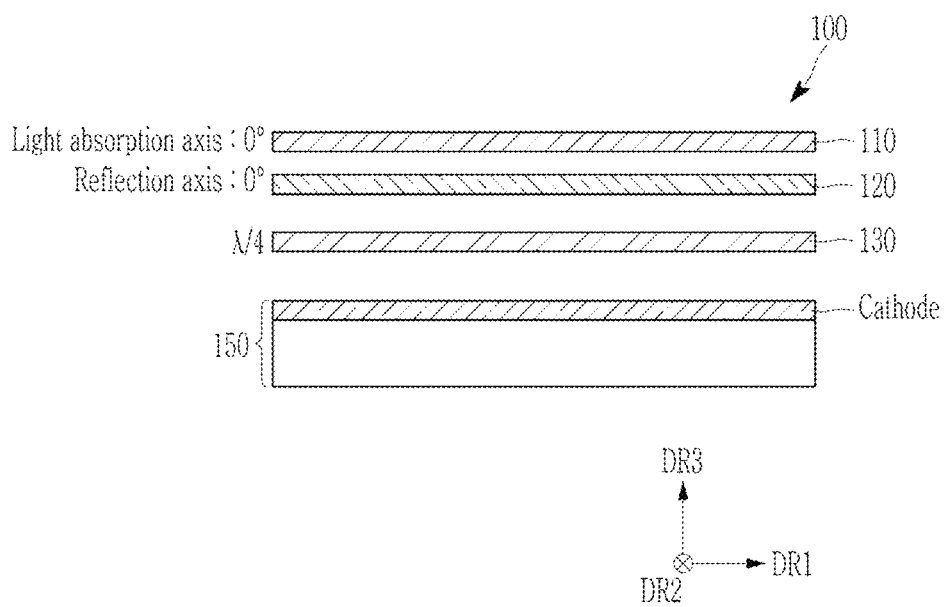
FIG. 2 illustrates a schematic cross-sectional view of a display panel for a head-mounted display device, according to an embodiment.
Figure 3:
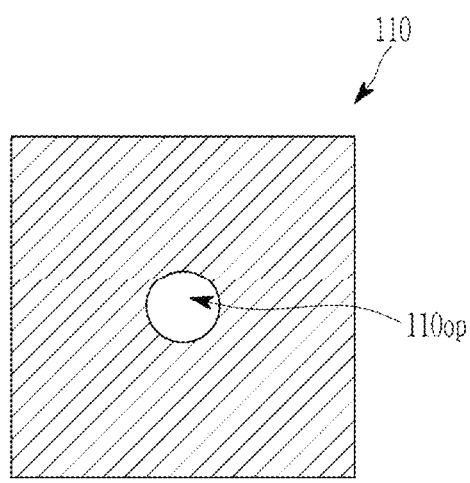
FIG. 3 illustrates a top plan view of an absorptive polarizer, according to an embodiment.

FIG. 2 illustrates a schematic cross-sectional view of the display panel for the head-mounted display device, according to an embodiment, and FIG. 3 illustrates a top plan view of an absorptive polarizer, according to an embodiment.

The display panel 100 used in the head-mounted display device, according to an embodiment, may be a self-emitting display panel that emits light by itself. Herein, an example of the self-emitting display panel may include one of a microLED, an organic light emitting diode (OLED), and an inorganic light emitting diode (LED), and hereinafter, an organic light emitting display panel will be mainly described. In an embodiment, FIG. 2 schematically illustrates the light emitting element unit 150 included in the display panel 100, wherein the light emitting element unit 150 may indicate a plurality of layers of the display panel 100 in which an organic light emitting element and a transistor connected thereto are formed. A cathode of a light emitting diode is positioned at the uppermost side of the light emitting element unit 150, wherein only the cathode is illustrated in FIG. 2 and the like, and wherein a detailed cross-sectional structure will be described with reference to FIG. 9.

In an embodiment, on a front surface of the light emitting element unit 150 (in the third direction DR3), an absorptive polarizer 110 (hereinafter referred to as an absorptive polarizer for a display panel) and a reflective polarizer 120 (hereinafter also referred to as a reflective polarizer for a display panel) are positioned, and a retarder 130 (hereinafter also referred to as a retarder for a display panel) is formed. The absorptive polarizer 110 may be positioned at the outermost side (in the third direction DR3) of the light emitting element unit 150, and the reflective polarizer 120 and the retarder 130 may be positioned at an inner side thereof.

In an embodiment, the absorptive polarizer 110 has a light absorption axis and has characteristics of absorbing and not transmitting linearly polarized light in a direction of the light absorption axis, and transmitting linearly polarized light perpendicular to the light absorption axis. Herein, the direction perpendicular to the absorption axis corresponds to a transmission axis. The absorptive polarizer 110 may have a film form including tri-acetyl cellulose (TAC).

In an embodiment, the reflective polarizer 120 has a reflection axis and has characteristics of reflecting linearly polarized light in a direction of the reflection axis and transmitting linearly polarized light perpendicular to the reflection axis. Herein, the direction perpendicular to the reflection axis corresponds to a transmission axis. Similar to the reflective polarizer 222, the reflective polarizer 120 may have a wire grid structure in which a plurality of metal lines having fine widths are arranged in one direction and may reflect light parallel to an arrangement direction of the metal lines and may transmit light perpendicular thereto. In this case, an interval between the metal lines may be narrower than a wavelength of visible light.

In an embodiment, the retarder 130 which is also referred to as a λ/4 plate may change linearly polarized light into circularly polarized light or circularly polarized light into linearly polarized light by providing a retardation of λ/4 with respect to a delay axis. A retardation axis of the retarder 130 may have an angle of about 45 degrees with respect to the light absorption axis of the absorptive polarizer 110 and/or the reflection axis of the reflective polarizer 120.

In an embodiment, and referring to FIG. 3, the absorptive polarizer 110 has an open portion 110op. The open portion 110op is a portion from which the absorptive polarizer 110 is partially removed, and light passing through the open portion 110op may be transmitted without being absorbed even if it is linearly polarized light in a direction of the light absorption axis of the absorptive polarizer 110. Herein, the open portion 110op may have an area that is equal to or greater than about 1/10 and smaller than about 1/9 of the total area of the absorptive polarizer 110 or an area of the display panel 100. In addition, the first curved lens 210 and/or the second curved lens 220 included in the optical system 200 may have a central axis (see CAX in FIG. 4), and the central axis may extend through the open portion 110op of the absorptive polarizer 110. In this embodiment, the central axis and the center of the open portion 110op may coincide. In FIG. 3, the open portion 110op has a circular shape, but the invention is not limited thereto and may have a flat shape of various polygons or ellipses.

In an embodiment, even if light passing through the open portion 110op of the absorptive polarizer 110 as described above is transmitted without being absorbed, it may be used for image display, thereby improving light efficiency.

Figure 4:
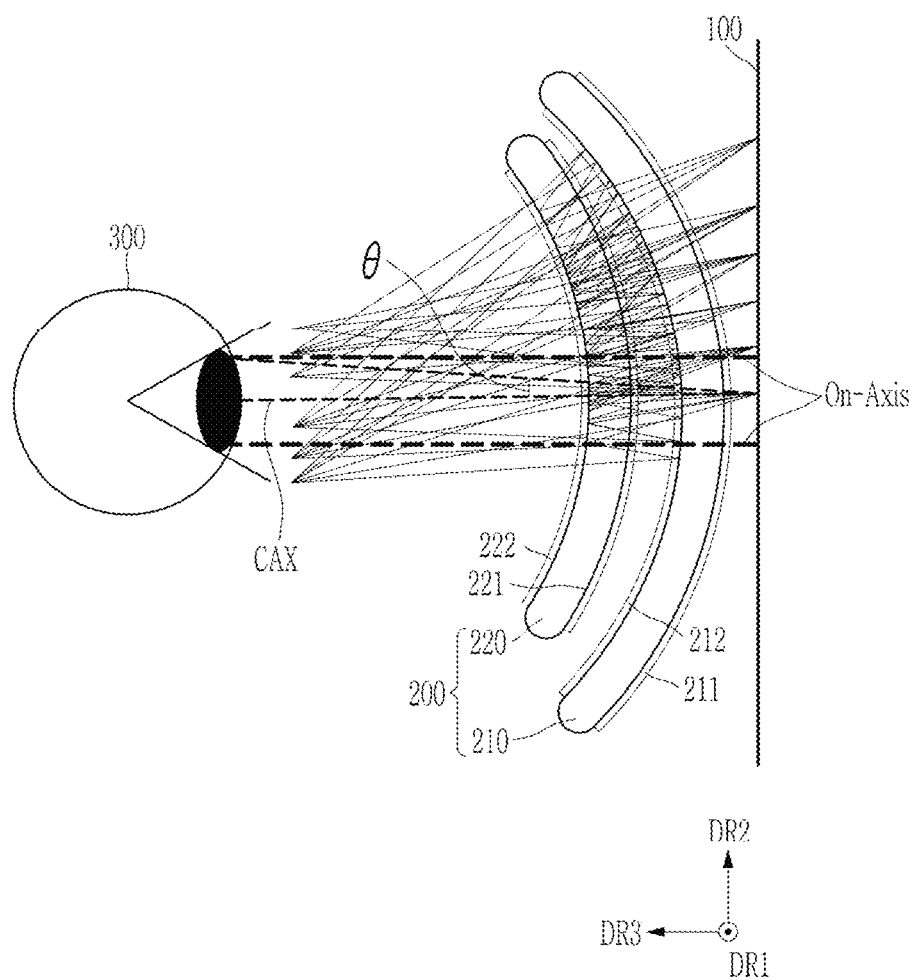
FIG. 4 illustrates a schematic diagram showing an optical path of a user's eye and a head-mounted display device, according to an embodiment.

In an embodiment, an optical path in the head-mounted display device having such a structure may be as illustrated in FIG. 4.

FIG. 4 illustrates a schematic diagram showing an optical path of a head-mounted display device, according to an embodiment.

In an embodiment, FIG. 4 schematically illustrates an optical path through which light emitted from the display panel 100 for a head-mounted display device passes through the optical system 200 and is transferred to the user's eyes 300.

In an embodiment, light emitted from the display panel 100 for a head-mounted display device may pass through the first curved lens 210 and the second curved lens 220 to be provided to the user's eyes 300. In addition, after being reflected from the reflective polarizer 222 of the second curved lens 220 and then reflected from the beam splitter 212 of the first curved lens 210, it may be provided to the user's eyes 300, and reflection from the reflective polarizer 222 and the beam splitter 212 may occur several times and then it may be provided to the user's eyes 300.

In an embodiment and referring to FIG. 4, the user's eyes 300 recognize light bent by the first curved lens 210 and the second curved lens 220, and thus an image that is larger than the display panel 100 for the head-mounted display device is viewed. As a result, a degree to which the user is immersed in the image may be high, and a three-dimensional effect felt during three-dimensional display may be improved. In addition, if the two curved lenses 210 and 220 are used, as illustrated in FIG. 4, an optical path becomes longer, so that even with a thin head-mounted display device, the user can get the same feeling as if an image is being presented from a distance.

In addition, in an embodiment and referring to FIG. 4, the central axis CAX of the first curved lens 210 and the second curved lens 220 included in the optical system 200 passes through the user's eyes 300. In addition, in FIG. 4, a region corresponding to the open portion 110op positioned in the absorptive polarizer 110 of the display panel 100 for the head-mounted display device is illustrated as On-Axis. That is, the region On-Axis corresponding to the open portion 110op may correspond to a region formed by extending a boundary line of the open portion 110*op* positioned on the absorptive polarizer 110 of the display panel 100 in parallel to the third direction DR3 or the direction of the central axis CAX. As illustrated in FIG. 4, the user's eyes 300 may be positioned corresponding to the region On-Axis corresponding to the open portion 110*op* and may be positioned within the region On-Axis corresponding to the open portion 110*op*, or may be partially positioned within the region On-Axis corresponding to the open portion 110*op*, according to another embodiment.

In an embodiment and referring to FIG. 4, a boundary line of the region On-Axis corresponding to the open portion 110*op* may have a certain angle θ with respect to the central axis CAX at a position of the user's eyes 300, and in this case, the angle θ may be greater than about 0 and smaller than or equal to about 5 degrees. An area of the open part 110*op* of the absorptive polarizer 110 may be formed as an area where an area of the region On-Axis corresponding to the open portion 110*op* may have a certain angle θ at the position of the user's eyes 300, and in this case, the angle θ may be greater than about 0 and smaller than or equal to about 5 degrees. In this case, the central axis CAX may coincide with the center of the open portion 110*op*.

Light characteristics and transmittance of the head-mounted display device according to an embodiment will be described in detail with reference to FIG. 5 to FIG. 8.

FIG. 5 to FIG. 8 each illustrate an optical path and transmittance of a head-mounted display device, according to an embodiment.

In an embodiment, in FIG. 5 to FIG. 8, each layer is illustrated as having a planar structure, but although an actual structure corresponds to FIG. 1, and the optical system 200 has a curved surface, it is briefly illustrated as a flat surface.

Figure 5:
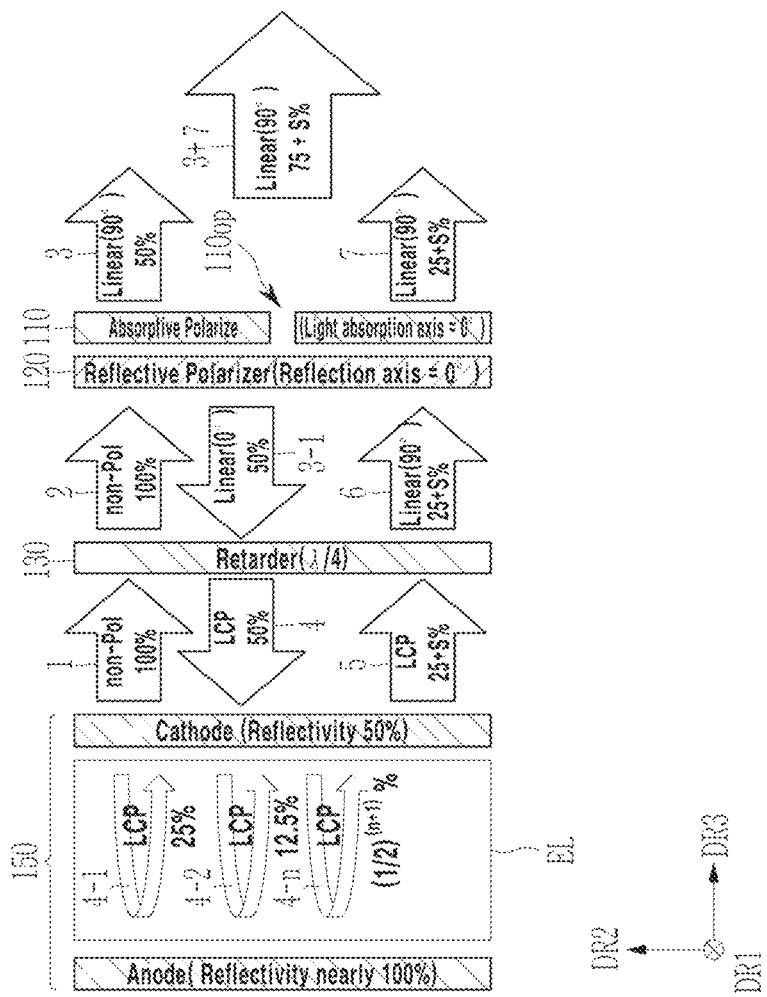
FIG. 5 illustrates an optical path and transmittance of a head-mounted display device, according to an embodiment.

First, in an embodiment, in FIG. 5, transmittance along with an optical path and polarization characteristics of the display panel 100 for the head-mounted display device are illustrated.

In an embodiment and referring to FIG. 5, the light emitting element unit 150 is illustrated in more detail than in FIG. 2, and in addition to a cathode, an anode and an intermediate layer EL are additionally illustrated. The anode, the intermediate layer EL, and the cathode may constitute a light emitting diode, and the intermediate layer EL, which is a layer positioned between the anode and the cathode, may include an emission layer and a functional layer.

In an embodiment, the anode is formed by including a metal layer through which light can be reflected without passing therethrough, and the cathode is formed to have a transflective characteristic in which the first half of the light is reflected and the second half of the light is transmitted. As a result, light in a direction opposite to the third direction DR3 is incident on the cathode, and half of it is transferred to the anode, reflected from the anode, and transferred to the cathode. If light is transferred to the cathode in the third direction DR3, the first half of the light is transmitted, and the second half is reflected and re-transferred to the anode. The light between the cathode and the anode increases an amount of light emitted in the third direction DR3 as the above process is continuously repeated, and in FIG. 5, it is illustrated to be further increased by S %. Herein, S % has a value of up to about 25%, and may have a value equivalent to about 25% in practice.

Meanwhile, according to another embodiment, a transflective characteristic of the cathode may vary, and in this case, the cathode may reflect a percentage of light that is greater than or less than about 50%.

In an embodiment and referring to FIG. 5, the retarder 130, the reflective polarizer 120, and the absorptive polarizer 110 are sequentially positioned at an upper side of the cathode in the third direction DR3, and the absorptive polarizer 110 has the open portion 110*op*.

In an embodiment, the reflective polarizer 120 and the absorptive polarizer 110 may be positioned at about 0° as reflection and absorption axes, respectively, and the retardation axis of the retarder 130 may be positioned at an angle of about 45° to the reflection and absorption axes of the reflective polarizer 120 and the absorptive polarizer 110.

In an embodiment and referring to FIG. 5, a number is assigned to each light, and characteristics of the light will be described according to the order of the corresponding numbers. In FIG. 5, light emitted from the display panel 100 for the head-mounted display device is described up to #7.

First, in an embodiment, referring to Light 1, light emitted in the third direction DR3 from the cathode of the light emitting diode is 100%, and is light having a polarization characteristic in all directions. In FIG. 5, it is described as non-Pol which shows that there is no polarized direction.

In an embodiment, thereafter, referring to Light 2, it passes through the retarder 130, the light incident on the retarder 130 includes light in all directions, and even if a delay of λ/4 is provided with respect to the delay axis, the transmitted light has light in all directions.

In an embodiment, thereafter, the light transmitted through the retarder 130 is incident to the reflective polarizer 120 and the absorptive polarizer 110, and a reflection axis of the reflective polarizer 120 and an absorption axis of the absorption polarizer 110 are formed in the same direction (0°), and thus light in the direction of the reflection axis (0°) of the reflective polarizer 120 is reflected, and light in a direction (90°) perpendicular thereto is transmitted through the reflective polarizer 120 and the absorptive polarizer 110. In FIG. 5, Light 3 represents light transmitted through the reflective polarizer 120 and the absorptive polarizer 110, and Light 3-1 represents light reflected from the reflective polarizer 120. Light 3 transmitted through the reflective polarizer 120 and the absorptive polarizer 110 is linearly polarized light having a direction of 90°, and only half (50%) of light incident on the reflective polarizer 120 and the absorptive polarizer 110 is transmitted. On the other hand, Light 3-1 reflected from the reflective polarizer 120 is also half (50%) of the light incident on the reflective polarizer 120 and the absorption polarizer 110, and is linearly polarized at 0°, which is the direction of the reflection axis.

In an embodiment, thereafter, referring to Light 4, if the light reflected from the reflective polarizer 120 is incident on the retarder 130, 50% of light transmitted as linearly polarized light of 0° is changed to left-circularly polarized light LCP by providing a delay only for the delay axis in a 45° direction. According to another embodiment, it may be changed to right-circularly polarized light RCP, but in this embodiment, it is set to be changed to left-circularly polarized light.

In an embodiment, thereafter, referring to Light in 4-1, one-fourth (25%) of the light is transmitted from the cathode and transferred to the anode, but is first reflected from the anode and transferred to the cathode. The right-circularly polarized light RCP is maintained as it is, the first half (12.5%) of the light (25%) transferred to the cathode is transmitted in the third direction DR3, and the second half (12.5%) is reflected back (see Light 4-2). Referring to Light 4-2, 12.5% of the light is retransferred to the anode, reflected a second time, and transferred to the cathode, where half is reflected and half is transmitted. This process is repeated continuously, and in FIG. 5, light reflected n times from the anode (Light 4-n) is illustrated. As illustrated therein, Light 4-n may have an amount of light corresponding to about $(½)^{(n+1)}\%$ based on 100%. That is, light (4-1) reflected once from the anode has about $(½)^{(1+1)}\%$—that is, 25% light, which is ¼ of 100%, and light (4-2) reflected twice from the anode has about $(½)^{(2+1)}\%$—that is, 12.5% light, which is ⅛ of 100%.

In an embodiment, light emitted from the cathode in the third direction DR3 by adding repeated reflection and transmission paths as described above is illustrated as Light 5. That is, referring to Light 5, half of the light (25%) reflected from Light 4 incident on the cathode of the light emitting diode and thereafter, light (S %) obtained by summing lights reflected from the anode several times, incident on the cathode, and then transmitted in the third direction DR3, are illustrated together. Herein, S % cannot exceed 25%—that is, an amount of light (4-1) that passes through the cathode and is transferred to the anode among Light 4, so it has a maximum value of 25%, and may have a value equivalent to 25% even if light lost due to some scattering is considered.

In an embodiment, light 5 may maintain left-circularly polarized light LCP as it is and may be incident on the retarder 130.

In an embodiment and referring to Light 6, as it passes through the retarder 130, the left-circularly polarized light LCP is changed back to linearly polarized light Linear, and in this case, it is changed to about 90° linearly polarized light, and incident light of 25+S % is transmitted as it is.

Thereafter, in an embodiment and referring to Light 7, the light incident to the reflective polarizer 120 and the absorptive polarizer 110 is the 90° linearly polarized light Linear, and thus since it is perpendicular to the reflection axis (0°) and the light absorption axis (0°), it is transmitted as it is. As a result, 25+S % of light having the 90° linear polarized light Linear is transmitted.

In an embodiment and referring to FIG. 5, the light transmitted through the reflective polarizer 120 and the absorptive polarizer 110 are illustrated as LIGHTS 3 and 7, respectively, and referring to lights 3+7, which are a sum of these, it may become 75+S % light with the 90° linearly polarized light Linear, and it can be a maximum of 100% light.

Accordingly, in an embodiment, the light transferred from the display panel 100 for the head-mounted display device to the optical system 200 has 90° linear polarized light Linear and is 75+S % light, which may be up to about 100%. This light is perpendicular to the reflection axis of the reflective polarizer 120 and perpendicular to the light absorption axis of the absorption polarizer 110 and is light on the transmission axis of the reflective polarizer 120 and the absorptive polarizer 110.

In an embodiment on the other hand, the absorptive polarizer 110 has the open portion 110op, but in FIG. 5, all light provided to the absorptive polarizer 110 is only light transmitted through the reflection type polarizer 120—that is, light (90°) perpendicular to the reflection axis of the reflective polarizer 120—and thus it has linearly polarized light corresponding to the transmission axis of the absorptive polarizer 110, and thus regardless of whether the open portion 110op is positioned or not, all light is transmitted the same as it is, so there is no difference according to the position thereof.

Hereinafter, in an embodiment, how light of 75+S % having the 90° linearly polarized light Linear provided from the display panel 100 for the head-mounted display device to the optical system 200 passes through the optical system 200 and is transferred to the user's eyes 300 will be described with reference to FIG. 6 to FIG. 8.

Figure 6:
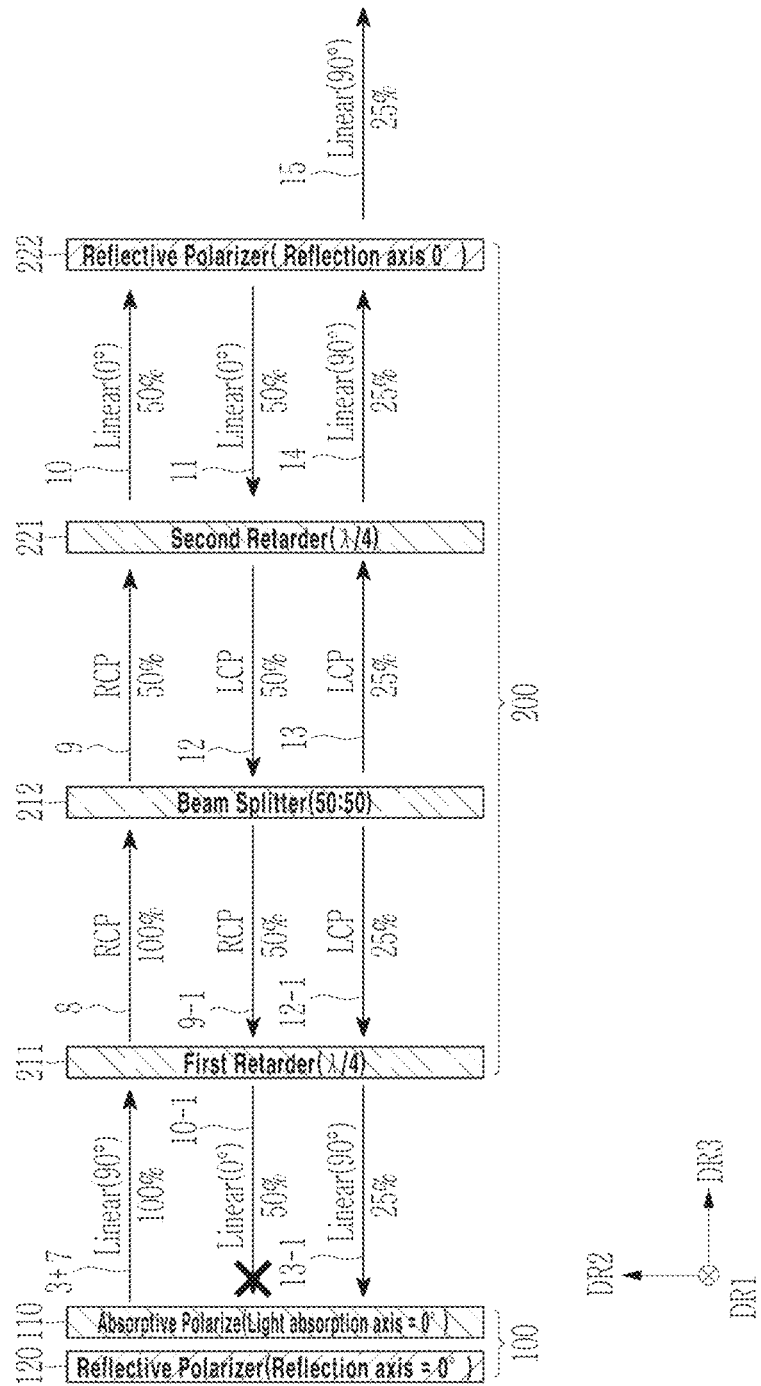
FIG. 6 illustrates an optical path and transmittance of a head-mounted display device, according to an embodiment.
Figure 7:
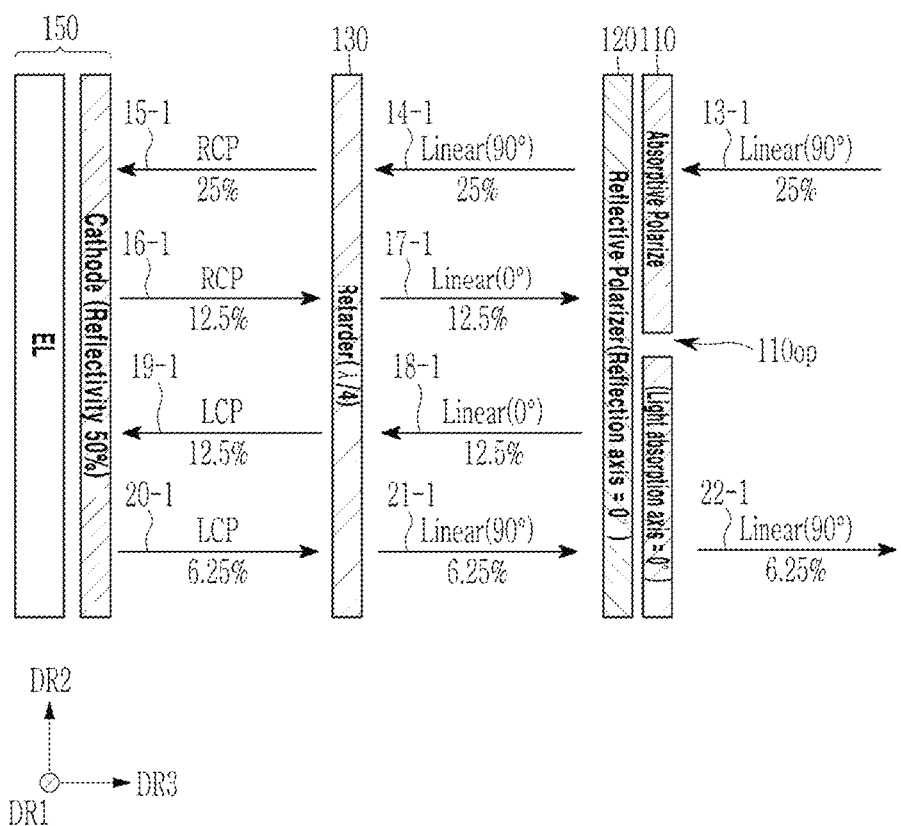
FIG. 7 illustrates an optical path and transmittance of a head-mounted display device, according to an embodiment.
Figure 8:
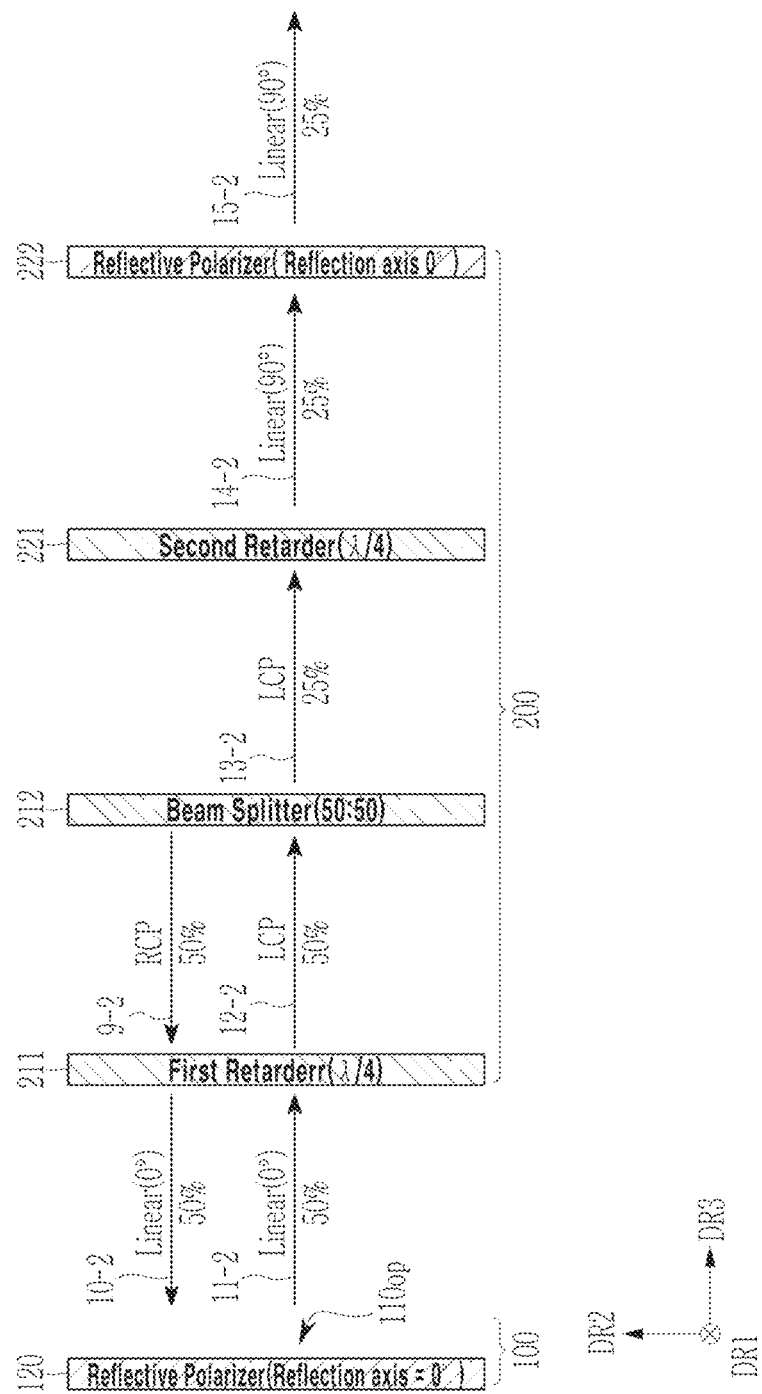
FIG. 8 illustrates an optical path and transmittance of a head-mounted display device, according to an embodiment.

FIG. 6 and FIG. 7 describe an embodiment where light incident on the absorptive polarizer 110 when light reflected from the optical system 200 is re-incident to the display panel 100 for the head-mounted display device, and FIG. 8 describes an embodiment where light incident to the open portion 110op of the absorptive polarizer 110 when it is re-incident to the display panel 100 for the head-mounted display device.

First, a setting of the optical system 200 of the head-mounted display device will be described with reference to FIG. 6.

In an embodiment, in the optical system 200 of the head-mounted display device of FIG. 6, a reflection axis of the reflective polarizer 222 is set to 0°. Delay axes of the first retarder 211 and the second retarder 221 may be positioned at about 45° with respect to the reflection axis of the reflective polarizer 222, and the reflection axis of the lower reflective polarizer 120 and a light absorption axis of the absorptive polarizer 110 may also be positioned at about 45°.

In FIG. 6, Light 3+7 is described as 100% light for convenience, and has a 90° linearly polarized light Linear, according to an embodiment.

In an embodiment and referring to Light 8, 100% of the light having the 90° linearly polarized light Linear transferred to the optical system 200 is changed to right-circularly polarized light RCP while passing through the first retarder 211, and 100% of right-circularly polarized light RCP is transmitted.

In an embodiment and referring to Light 9, while 100% of the right-circularly polarized light RCP passes through the beam splitter 212, half of the incident light is transmitted, and thus 50% of right-circularly polarized light RCP is transferred in the third direction DR3. On the other hand, the remaining 50% of the light incident from the beam splitter 212 is reflected, which is illustrated as Light 9-1.

In an embodiment and referring to Light 10, the second retarder 221 changes right-circularly polarized light RCP into 0° linearly polarized light, so that 50% of the 0° linearly polarized light is transferred to the reflective polarizer 222.

In an embodiment and referring to Light 11, the reflective polarizer 222 has the reflection axis of 0°, and thus all 0° light is reflected and transferred to the second retarder 221 again, so 50% of light having 0° linearly polarized light is incident again to the second retarder 221.

In an embodiment and referring to Light 12, 50% of the 0° linearly polarized light is changed to left-circularly polarized light LCP while passing through the second retarder 221, and thus 50% of the left-circularly polarized light LCP is incident on the beam splitter 212 again.

In an embodiment and referring to Light 13, as 50% of the left-circularly polarized light LCP is incident to the beam splitter 212, 25% of the light, which is half of the incident light, is reflected, the remaining 25% of the light is transmitted (see Light 12-1). Herein, the remaining 25% of the Light 12-1 transmitted through the beam splitter 212 is reflected back from the display panel 100 and provided to the user's eyes, thereby improving light efficiency, which will be described with reference to FIG. 7.

In an embodiment and referring to Light 14, 25% of the left-circularly polarized light LCP is changed to 90° linearly polarized light Linear while passing through the second retarder 221. Accordingly, 25% of the 90° linearly polarized light Linear is transferred to the reflective polarizer 222.

In an embodiment and referring to Light 15, the reflective polarizer 222 has a reflection axis of 0° and a transmission axis of 0° perpendicular thereto, and thus all the 90° linearly polarized light Linear is transmitted. Accordingly, 25% of the light passes through the optical system 200 and is transferred to the user's eyes 300.

In general, in an embodiment, since the head-mounted display including a polarizer has a light efficiency of about 12.5%, there is a difference in light efficiency twice that of the present embodiment. This difference in light efficiency may be a very large difference, and a brighter image may be displayed with a smaller current. If the head-mounted display uses a battery, it may have an advantage of significantly increasing the operating time with a fully charged battery.

Hereinafter, Light 9-1 and Light 12-1 transferred from the beam splitter 212 in FIG. 6 to the display panel 100 for the head-mounted display device will be described, according to an embodiment.

First, in an embodiment, the remaining Light 9-1, other than the light transmitted by the Light 9 in which Light 8 is incident on the beam splitter 212 is reflected and transferred in a lower direction (a direction opposite to the third direction DR3). Accordingly, if 100% of right-circularly polarized light RCP (Light 8) meets the beam splitter 212, 50% of it is transmitted (Light 9), but the remaining 50% is reflected, and Light 9-1 represents the reflected light. In this case, a phase of the light reflected from the beam splitter 212 is the same as that of the right-circularly polarized RCP.

Thereafter, in an embodiment and referring to Light 10-1 in FIG. 6, the right-circularly polarized light (RCP) is changed to 0° linear polarized light while passing through the first retarder 211 again, and the amount of light is maintained at 50%.

Thereafter, in an embodiment, 50% of 0° linearly polarized light is transferred to the absorptive polarizer 110 positioned at the uppermost side of the display panel 100 for the head-mounted display device. The absorptive polarizer 110 has a light absorption axis of 0°, and all the 0° linearly polarized light transferred from the optical system 200 to the absorptive polarizer 110 is absorbed and lost.

Accordingly, in an embodiment and referring to FIG. 6, light incident from the display panel 100 for the head-mounted display device and directly reflected by the beam splitter 212 is absorbed by the absorptive polarizer 110 and is lost, so that a user may not visually recognize it.

Meanwhile, in an embodiment, similar to Light 12 in FIG. 6, if the left-circularly polarized light LCP is incident on the beam splitter 212, it is transmitted through the beam splitter 212. Light 12-1 will be described hereinafter in detail.

In an embodiment, it is illustrated that 50% of left-circularly polarized light LCP is incident back to the beam splitter 212 for Light 12 in FIG. 6. The beam splitter 212 reflects the first half (25%) of the incident light (Light 13), but transmits the second half (25%), and light transmitted through the beam splitter 212 is illustrated as Light 12-1 in FIG. 6.

In an embodiment and referring to Light 12-1 of FIG. 6, 25% of left-circularly polarized light LCP is transmitted through the beam splitter 212 and is transferred to the first retarder 211.

In an embodiment and referring to Light 13-1 in FIG. 6, 25% of left-circularly polarized light LCP is changed to 90° linearly polarized light while passing through the first retarder 211, and thus 25% of 90° linearly polarized light is transferred to the display panel 100 for the head-mounted display device.

In an embodiment and referring to Light 13-1 in FIG. 6, if 25% of 90° linearly polarized light is incident on the reflective polarizer 120 and the absorptive polarizer 110, it has a polarization direction that is perpendicular to the reflection axis (0°) of the reflective polarizer 120 and the absorption axis (0°) of the absorptive polarizer 110, and it is transmitted as it is. A detailed description of transmittance of Light 13-1 of FIG. 6 together with the path and polarization characteristics of light within the display panel 100 for the head-mounted display device is shown in FIG. 7.

In an embodiment and referring to FIG. 7, Light 13-1 passes through the reflective polarizer 120 and the absorptive polarizer 110 as it is and becomes Light 14-1.

In an embodiment and referring to Light 14-1 in FIG. 7, if 25% of 90° linearly polarized light is incident on the retarder 130, like Light 15-1, it is changed to right-circularly polarized light RCP, and 25% of the right-circular polarized light RCP is transferred to the Cathode of the light emitting diode.

In an embodiment and referring to Light 16-1 of FIG. 7, the first half of the light incident on the cathode of the light emitting diode is reflected and transferred to the third direction DR3 again. In this case, a phase thereof may maintain the right-circularly polarized light RCP, and 12.5% of the right-circularly polarized light RCP is transferred to the retarder 130 again.

In an embodiment on the other hand, as illustrated in the light emitting element unit 150 of FIG. 5, the second half of Light 15-1 incident on the Cathode of the light emitting diode may be recycled while being reflected back at the Anode and passing through the Cathode again. In FIG. 7, related descriptions are omitted. According to recycling of light in the light emitting element unit 150, an amount of Light 16-1 traveling in the third direction DR3 from the cathode may be increased more than the percentage illustrated in FIG. 7.

In an embodiment and referring to Light 17-1 in FIG. 7, 12.5% of the left-circularly polarized light LCP passes through the retarder 130 and is changed to 0° linearly polarized light, and 12.5% of the 0° linearly polarized light is transferred to the reflective polarizer 120 and the absorptive polarizer 110.

In an embodiment and referring to Light 18-1 in FIG. 7, the reflection axis of the reflective polarizer 120 has 0°, and thus 12.5% of 0° light linearly polarized is reflected as it is and transferred to the retarder 130 again.

In an embodiment and referring to Light 19-1 in FIG. 7, 12.5% of the 0° linearly polarized light incident on the retarder 130 is changed to 12.5% of left-circularly polarized light LCP and transferred to the cathode of the light emitting diode.

In an embodiment and referring to Light 20-1 in FIG. 7, half of the light incident on the cathode of the light emitting diode is reflected and transferred in the third direction DR3, and in this case, a phase thereof maintains left-circularly polarized light LCP, and 6.25% of the left-circularly polarized light LCP is transferred in the third direction DR3.

On the other hand, in an embodiment, as illustrated in the light emitting element unit 150 of FIG. 5, the second half of Light 19-1 incident on the cathode of the light emitting diode may be recycled while being reflected back at the anode and passing through the cathode again. In FIG. 7, related descriptions are omitted. According to recycling of light in the light emitting element unit 150, an amount of Light 20-1 traveling in the third direction DR3 from the cathode may be increased more than the percentage illustrated in FIG. 7.

In an embodiment and referring to Light 21-1 in FIG. 7, 6.25% of left-circularly polarized light LCP is changed to 6.25% of 90° linearly polarized light while passing through the retarder 130 and is incident on the reflective polarizer 120.

In an embodiment and referring to Light 22-1 in FIG. 7, the reflection axis of the reflective polarizer 120 has 0° and light of 90° perpendicular thereto is transmitted, and thus 6.25% of the 90° linearly polarized light is transferred to the optical system 200 as it is.

In an embodiment, light 22-1 in FIG. 7 is linearly polarized at 90°, has same linear polarization as that of Light 3+7 in FIG. 6, and may travel the same path again. In this embodiment, although an amount of light may be relatively small, light efficiency may be improved because an additional amount of light may be provided in addition to the existing amount of light.

Meanwhile, hereinafter, light incident to the open portion 110op of the absorptive polarizer 110 will be described with reference to FIG. 8, according to an embodiment.

In an embodiment, in FIG. 8, compared to FIG. 6, the open portion 110op where the absorptive polarizer 110 is omitted is positioned, and thus the reflective polarizer 120 is illustrated, and an open portion 110op is illustrated instead of the absorptive polarizer 110.

In an embodiment, light 3+7 in FIG. 8 and Light 8 in FIG. 6 are omitted, and Light 8 is illustrated starting with Light 9-2 reflected from the beam splitter 212. That is, the remaining Light 9-2, other than the light transmitted by Light 9 in which Light 8 is incident on the beam splitter 212 is reflected and transferred in a lower direction (a direction opposite to the third direction DR3). Accordingly, if 100% of right-circularly polarized light RCP (Light 8) meets the beam splitter 212, 50% of it is transmitted (Light 9), but the remaining 50% is reflected, and Light 9-2 represents the reflected light. In this case, a phase of the light reflected from the beam splitter 212 is identical to the right-circularly polarized light RCP.

In an embodiment, thereafter, referring to Light 10-2 in FIG. 8, the right-circularly polarized light (RCP) is changed to 0° linear polarized light while passing through the first retarder 211 again, and the amount of light is maintained at 50%.

In an embodiment, thereafter, 50% of the 0° linear polarized light is transferred to the open portion 110op of the absorptive polarizer 110 positioned at the uppermost side of the display panel 100 for the head-mounted display device, and thus it is not absorbed by the absorptive polarizer 110, but is transferred to the reflective polarizer 120 positioned there below. Since the reflection axis of the reflective polarizer 120 has 0°, it is reflected like Light 11-2. In this case, Light 11-2 is 0° linear polarized light, and light quantity is maintained at 50%.

In an embodiment, thereafter, referring to Light 12-2, 50% of the light having 0° linear polarized light transferred to the optical system 200 is changed to left-circularly polarized light LCP while passing through the first retarder 211, and 50% of the left-circularly polarized LCP is transmitted.

In an embodiment and referring to Light 13-2, while 50% of left-circularly polarized light LCP passes through the beam splitter 212, half of the incident light is transmitted, and thus 25% of left-circularly polarized light LCP is transferred in the third direction DR3. On the other hand, the remaining 25% of the light incident from the beam splitter 212 is reflected, which is not illustrated. Additionally, 25% of the reflected light incident from the beam splitter 212 is changed to 25% of the light having 90° linearly polarized light Linear while passing through the first retarder 211, and then passes through the open portion 110op of the absorptive polarizer 110 and is transferred to the reflective polarizer 120. The reflection axis of the reflective polarizer 120 has 0°, and thus 25% of the light having the 90° linear polarized light Linear is transmitted and transferred to the display panel 100.

In an embodiment, as illustrated in FIG. 7, 25% of the light having the 90° linearly polarized light Linear transferred to the display panel 100 will be provided back to the optical system 200 as 6.25% of the light having the 90° linearly polarized light Linear (see Light 22-1). In addition, as illustrated in the light emitting element unit 150 of FIG. 5, some of the light incident to the cathode of the light emitting diode (see Light 15-1 and Light 19-1 in FIG. 7) may be recycled while being reflected back at the anode and passing through the cathode again. According to recycling of light in the light emitting element unit 150, an amount of light traveling in the third direction DR3 from the cathode may be further increased.

In an embodiment and referring again to FIG. 8, Light 13-2 is incident on the second retarder 221, and referring to Light 14-2, the second retarder 221 changes left-circularly polarized light LCP to 90° linearly polarized light to transfer 25% of the 90° linearly polarized light to the reflective polarizer 222.

In an embodiment and referring to Light 15-2, the reflective polarizer 222 has a reflection axis of 0°, all of the 90° light is transmitted, and 25% of the light is transferred to the user's eyes 300.

As described above, in an embodiment, if the open portion 110op is formed in the absorptive polarizer 110, as light to be absorbed by the absorptive polarizer 110 is reflected or transmitted from the reflective polarizer 120 through the open portion 110op to be recycled, light efficiency may be increased.

The reflection axis, the light absorption axis, and the delay axis used in the above embodiment may have angles different from each other by a predetermined angle at 0°, 90°, and 45°. In this case, the predetermined angle may be greater than 0° and smaller than 5°.

Meanwhile, according to an embodiment, the reflection axis of the reflective polarizer 120 of the display panel 100 for the head-mounted display device and the reflection axis of the reflective polarizer 222 of the optical system 200 may form an angle of about 90°.

However, in an embodiment, it may be appropriate that the reflection axis of the reflective polarizer 120 and the absorption axis of the absorptive polarizer 110 of the display panel 100 for the head-mounted display device are parallel to each other.

Hereinafter, a cross-sectional structure and a modified structure of the display panel 100 for the head-mounted display device will be examined in more detail with reference to FIG. 9 to FIG. 11.

First, the structure of the display panel 100 for the head-mounted display device will be described with reference to FIG. 9, according to an embodiment.

Figure 9:
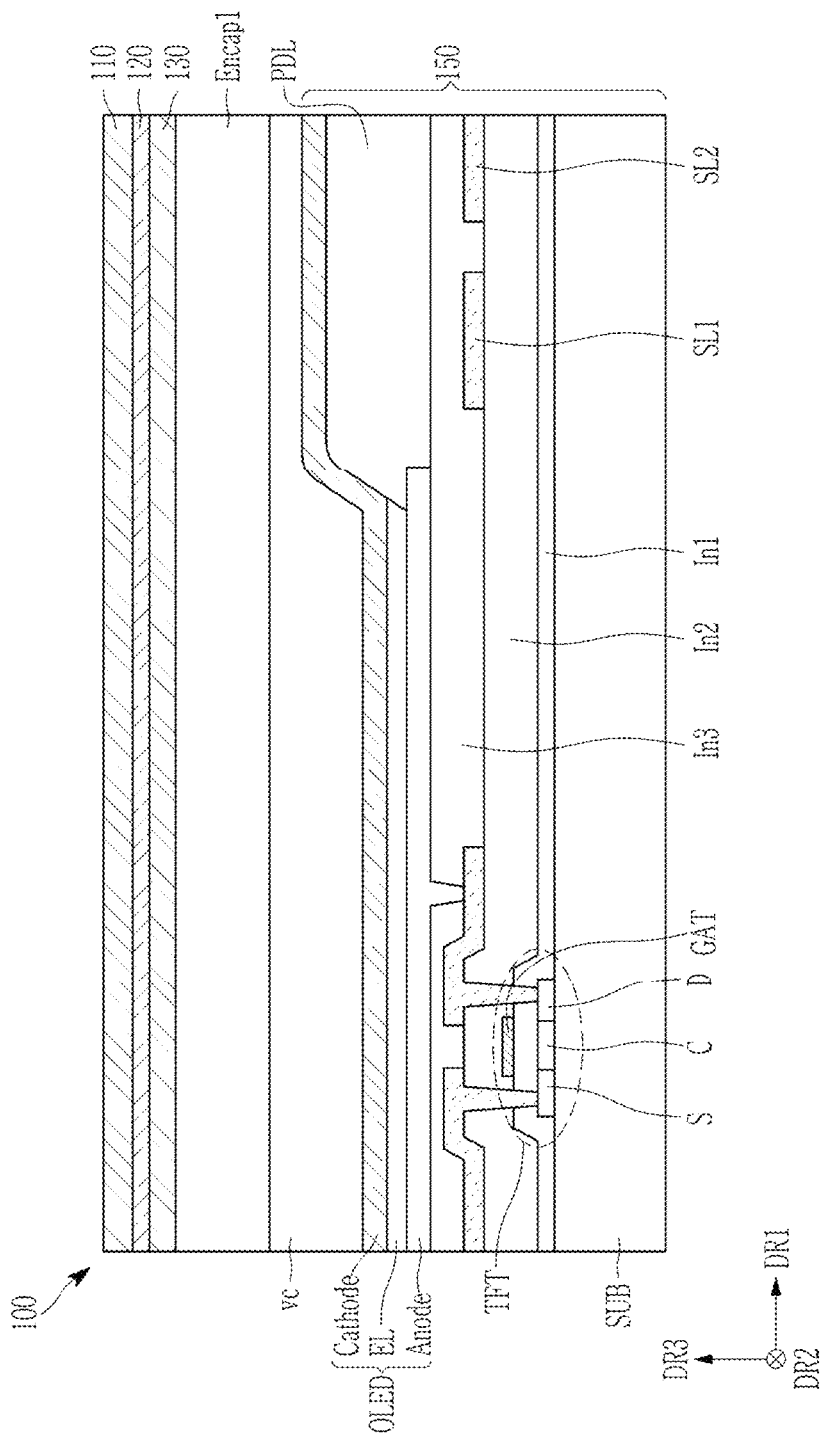
FIG. 9 illustrates a detailed cross-sectional view of a display panel for a head-mounted display device, according to an embodiment.

FIG. 9 illustrates a detailed cross-sectional view of the display panel for the head-mounted display device, according to an embodiment.

An organic light emitting display panel including an organic light emitting diode OLED is illustrated as the display panel 100 used in the head-mounted display device, according to the embodiment of FIG. 9.

In an embodiment, although FIG. 9 illustrates a cathode of the light emitting diode shown in the uppermost layer of the light emitting element unit 150 in FIG. 2 and the like, an encapsulation substrate Encap1 may be additionally included thereon.

In an embodiment, the retarder 130, the reflective polarizer 120, and the absorptive polarizer 110 are sequentially positioned on the encapsulation substrate Encap1, but they have already been reviewed, and thus remaining parts will be mainly described below.

In an embodiment, an organic light emitting display panel including the organic light emitting diode OLED includes a substrate SUB, and the substrate SUB includes an inorganic insulating material such as glass or an organic insulating material such as plastic and/or polyimide (PI), or it may be formed of a silicon substrate. According to another embodiment, the substrate SUB may have a structure in which at least one base layer including a polymer resin sequentially stacked and at least one inorganic layer which are alternately stacked. The substrate SUB may have various degrees of flexibility. The substrate SUB may be a rigid substrate or a flexible substrate capable of bending, folding, rolling, and/or the like.

In an embodiment, a semiconductor layer is disposed on the substrate SUB. The semiconductor layer may include polysilicon or an oxide semiconductor. The semiconductor layer includes a channel region C, a first region S, and a second region D. The first region S and the second region D are positioned at opposite sides of the channel region C. The channel region C is a semiconductor region doped with a small amount of impurities, or not doped with impurities compared to the first region S and the second region D, and the first region S and the second region D are semiconductor regions doped with a larger amount of impurities compared to the channel region C.

In an embodiment, a first inorganic insulating layer In1 may be disposed on the semiconductor layer. The first inorganic insulating layer In1 may have a single layer or multiple layers including at least one of silicon oxide ($SiO_x$), silicon nitride ($SiN_x$), and silicon oxynitride ($SiO_xN_y$).

In an embodiment, a first gate conductive layer including a gate electrode GAT is disposed on the first inorganic insulating layer In1. The first gate conductive layer may be a single layer or a multilayer in which a metal film including any one of copper (Cu), a copper alloy, aluminum (Al), an aluminum alloy, molybdenum (Mo), a molybdenum alloy, titanium (Ti), and a titanium alloy is stacked. The gate electrode GAT may overlap the channel region C of the semiconductor layer in a plan view.

In an embodiment, the semiconductor layer including the channel region C, the first region S, and the second region D, and the gate electrode GAT overlapping the channel region C may constitute one transistor TFT.

In an embodiment, a second inorganic insulating layer In2 is disposed on the first gate conductive layer and the first inorganic insulating layer In1. The second inorganic insulating layer In2 may be a single layer or multiple layers including at least one of silicon oxide ($SiO_x$), silicon nitride ($SiN_x$), and silicon oxynitride ($SiO_xN_y$).

In an embodiment, a first data conductive layer including electrodes (source electrode and drain electrode) connected to the first region S and the second region D of the semiconductor layer and signal lines SL1 and SL2 are disposed on the second inorganic insulating layer In2. The source electrode and the drain electrode may be electrically connected to the first region S and the second region D of the semiconductor layer, respectively, through contact holes formed in the second inorganic insulating layer In2. According to another embodiment, the semiconductor layer may be directly extended to be electrically connected to an adjacent pixel without a source electrode and a drain electrode. The first data conductive layer may include aluminum (Al), silver (Ag), magnesium (Mg), gold (Au), nickel (Ni), chromium (Cr), calcium (Ca), molybdenum (Mo), titanium (Ti), tungsten (W), copper (Cu), and/or the like, and may have a single layer structure or a multilayer structure including the material.

According to another embodiment, a second gate conductive layer and an additional inorganic insulating layer may be further included on the second inorganic insulating layer In2 and between the first data conductive layer and the second inorganic insulating layer In2. The second gate conductive layer may include a storage electrode forming a storage capacitor while overlapping the gate electrode of the first gate conductive layer. The additional inorganic insulating layer covers the second gate conductive layer to insulate it from the first data conductive layer.

In an embodiment, a first organic insulating layer In3 is disposed on the first data conductive layer. The first organic insulating layer In3 is disposed thereon. The first organic insulating layer In3 may include a general purpose polymer such as poly(methyl methacrylate) (PMMA) or polystyrene (PS), a polymer derivative having a phenolic group, an organic insulating material such as an acrylic polymer, an imide polymer, a polyimide, an acrylic polymer, a siloxane polymer, etc.

In an embodiment, an opening may be positioned in the first organic insulating layer In3, and an electrode of the transistor TFT is electrically connected to an anode.

In an embodiment, the Anode is positioned on the first organic insulating layer In3. The anode is electrically connected to the transistor TFT through an opening of the first organic insulating layer In3. The Anode may include a metal such as silver (Ag), lithium (Li), calcium (Ca), aluminum (Al), magnesium (Mg), and gold (Au), and may also include a transparent conductive oxide (TCO) such as indium zinc oxide (IZO) and indium tin oxide (ITO). The Anode may be formed as a single layer including a metal material or a transparent conductive oxide, or a multiple layer including the same.

In an embodiment, a pixel defining layer PDL is disposed on the first organic insulating layer In3 and the Anode. The pixel defining layer PDL overlaps at least a portion of the Anode, and has an opening defining an emission region. The opening may have a planar shape almost similar to that of the Anode. The opening may have a rhombus or octagonal shape that is similar to a rhombus in a plan view, but the present invention is not limited thereto, and may have any shape such as a quadrangle, a polygon, a circle, or an oval.

In an embodiment, the pixel defining layer PDL may include a general purpose polymer such as poly(methyl methacrylate) (PMMA) or polystyrene (PS), a polymer derivative having a phenolic group, an organic insulating material such as an acrylic polymer, an imide polymer, a polyimide, an acrylic polymer, and/or a siloxane polymer.

In an embodiment, an intermediate layer EL is disposed on the pixel defining layer PDL and the Anode. The intermediate layer EL may include an emission layer and a functional layer. The emission layer of the intermediate layer EL generates light of a predetermined color so that the organic light emitting diode OLED can display one of the three primary colors of light. In addition, according to another embodiment, all organic light emitting diodes OLED may equally display white light or light of a specific wavelength band. In this case, a color filter or a color conversion layer may be further included at an upper side of the organic light emitting diode OLED so that an image may be displayed while light emitted from each organic light emitting diode OLED is changed to one of the three primary colors of light. If the organic light emitting diode OLED displays white light, the intermediate layer EL may have a structure in which a plurality of emission layers and a plurality of functional layers are stacked (hereinafter referred to as a tandem structure), and if the light emitted from each of the emission layers is combined, white light may be obtained. The emission layer EL may include an organic material and/or an inorganic material. In an embodiment, the emission layer may be formed only within an opening of the pixel defining layer PDL.

Meanwhile, in an embodiment, the functional layer of the intermediate layer EL may include at least one of a hole injection layer, a hole transporting layer, an electron transporting layer, and an electron injection layer. The functional layer may be divided into a first functional layer disposed between the anode and the emission layer, and a second functional layer disposed between the emission layer and the Cathode. Each functional layer may have a shape overlapping a front surface of the substrate SUB. The functional layer may be disposed over a plurality of pixels.

In an embodiment, the Cathode is positioned on the intermediate layer EL. The Cathode may include a reflective metal including calcium (Ca), barium (Ba), magnesium (Mg), aluminum (Al), silver (Ag), platinum (Pt), palladium (Pd), gold (Au), nickel (Ni), neodymium (Nd), iridium (Ir), chromium (Cr), lithium (Li), calcium (Ca), etc., and/or a transparent conductive oxide (TCO) such as indium tin oxide (ITO) or indium zinc oxide (IZO). The Cathode may have a transflective characteristic.

In an embodiment, the Anode, the intermediate layer EL, and the Cathode may constitute an organic light emitting element OLED. However, the invention is not limited thereto, and the Cathode may be disposed under the intermediate layer EL, and the Anode may be disposed on the intermediate layer EL.

In an embodiment, holes and electrons are injected into the intermediate layer EL from the Anode and the Cathode, respectively, and in this case, excitons formed by combining the injected holes and electrons are emitted when they fall from an excited state to a ground state.

In an embodiment, the encapsulation substrate Encap1 is positioned on the Cathode, and a space vc may be positioned between the Cathode and the encapsulation substrate Encap1. In this space vc, an inert gas such as nitrogen gas may be filled, and/or another optically transparent filler may be positioned. In addition, according to another embodiment, an optically transparent planarization film or an adhesive for attaching the encapsulation substrate Encap1 may be positioned thereon. Meanwhile, according to still another embodiment, the encapsulation substrate Encap1 may be attached by a seal member positioned around a display area displaying an image.

In an embodiment, the encapsulation substrate Encap1 may be formed of optically isotropic glass or polymethyl methacrylate (PMMA).

In an embodiment, since the organic light emitting diode is very vulnerable to moisture and oxygen, the encapsulation substrate Encap1 seals the organic light emitting diode OLED and blocks inflow of external moisture and oxygen.

In an embodiment, a spacer (not illustrated) may be further formed on the pixel defining layer PDL to maintain a distance from the encapsulation substrate. In this case, the spacer may be formed below the Cathode.

In an embodiment, although only one transistor TFT is illustrated in FIG. 9, each pixel may actually include two or more transistors. In addition, although FIG. 9 illustrates a structure including one semiconductor layer, it may be configured to include semiconductor layers having different characteristics and may include a polycrystalline semiconductor and an oxide semiconductor, according to another embodiment.

Figure 10:
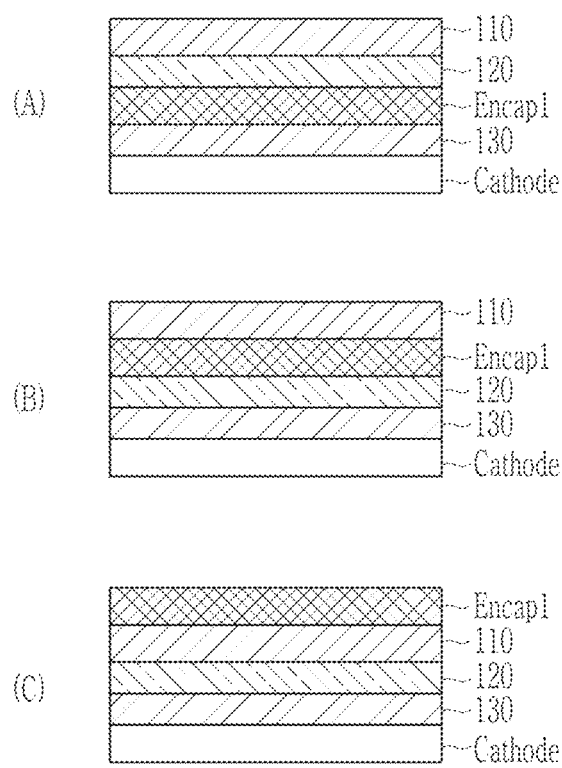
FIG. 10 illustrates a schematic cross-sectional view of a display panel for a head-mounted display device, according to various embodiments.

Although FIG. 9 illustrates an embodiment in which the retarder 130, the reflective polarizer 120, and the absorptive polarizer 110 are sequentially positioned on the encapsulation substrate Encap1, it may be modified as illustrated in FIG. 10.

Hereinafter, a modified structure of the display panel 100 for the head-mounted display device will be described through FIG. 10, according to an embodiment.

FIG. 10 illustrates a schematic cross-sectional view of a display panel for the head-mounted display device, according to various embodiments.

In an embodiment, in FIG. 10, unlike in FIG. 9, instead of illustrating a detailed cross-sectional structure, the encapsulation substrate Encap1 and the Cathode are illustrated to briefly show a top-down relationship to each layer.

First, referring to FIG. 10(A), an embodiment in which the retarder 130 is positioned below the encapsulation substrate Encap1 is illustrated. That is, in the display panel 100 for the head-mounted display device according to FIG. 10(A), the retarder 130 is positioned on the Cathode of a light emitting diode, the encapsulation substrate Encap1 is positioned thereon, and the reflective polarizer 120 and the absorptive polarizer 110 are positioned thereon.

Meanwhile, referring to FIG. 10(B), an embodiment in which the reflective polarizer 120 may also be positioned under the encapsulation substrate Encap1 is shown. That is, in the display panel 100 for the head-mounted display device according to FIG. 10(B), the retarder 130 and the reflective polarizer 120 are positioned on the Cathode of the light emitting diode, the encapsulation substrate Encap1 is positioned thereon, and the absorptive polarizer 110 is positioned thereon.

Meanwhile, referring to FIG. 10(C), an embodiment in which the encapsulation substrate Encap1 is positioned on the absorptive polarizer 110 is illustrated. That is, in the display panel 100 for the head-mounted display device according to FIG. 10(C), the retarder 130, the reflective polarizer 120, and the absorptive polarizer 110 are positioned on the Cathode of the light emitting diode, and the encapsulation substrate Encap1 is positioned thereon.

In an embodiment, the encapsulation substrate Encap1 is formed of glass or polymethyl methacrylate (PMMA) similar to the substrate SUB and it is easy to attach an optical film to one side thereof, and modifications as illustrated in FIG. 10(A) to FIG. 10(C) are possible.

In an embodiment, in addition to the examples shown in FIG. 10, when an order of the retarder 130, the reflective polarizer 120, and the absorption type polarizer 110 is maintained, an additional optically isotropic layer may be further included between each optical film.

According to another embodiment, an encapsulation layer may be formed by stacking an insulating film instead of the encapsulation substrate Encap1, which will be described with reference to FIG. 11. In an embodiment and referring to FIG. 11, various layer relationships as illustrated in FIG. 10 may be applied.

Figure 11:
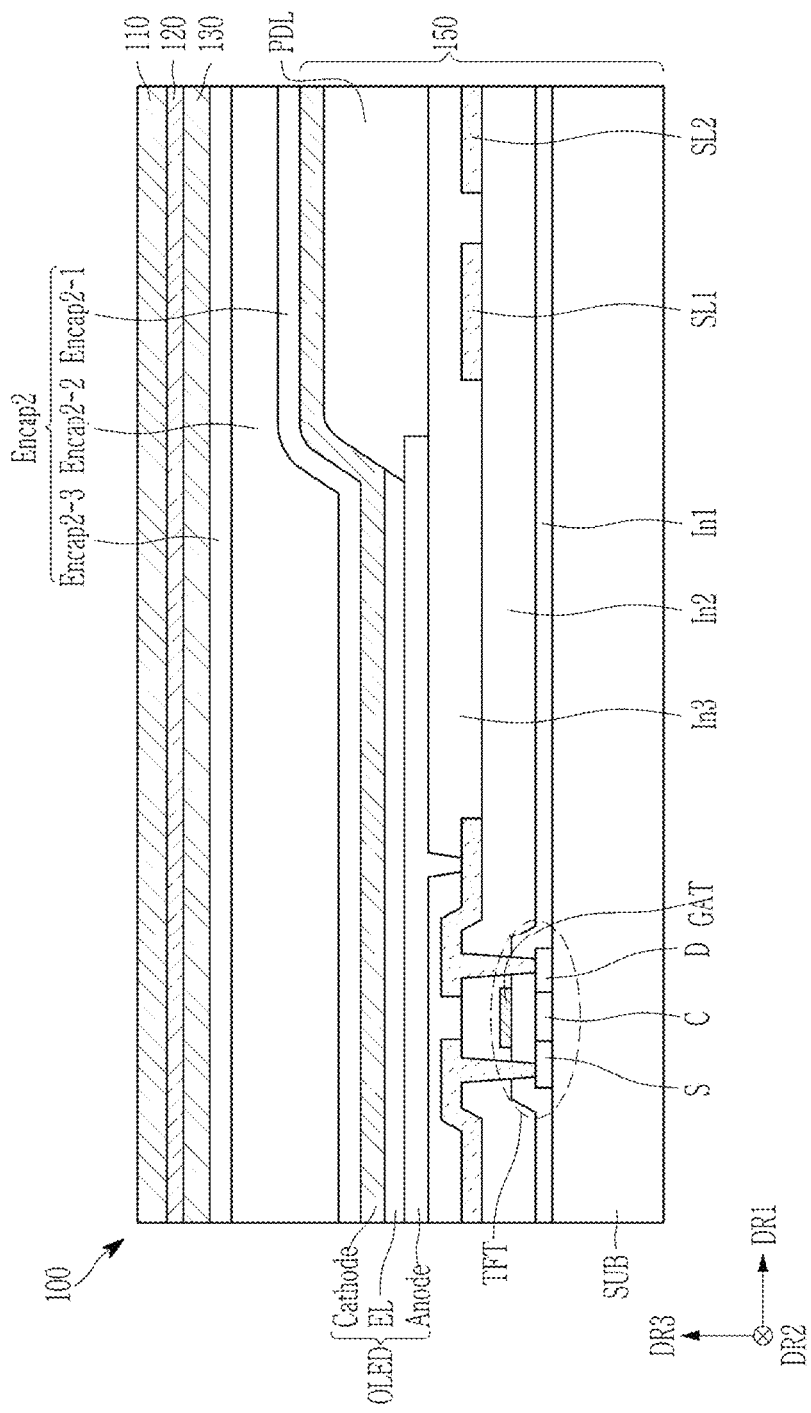
FIG. 11 illustrates a detailed cross-sectional view of a display panel for a head-mounted display device, according to another embodiment.

FIG. 11 illustrates a detailed cross-sectional view of a display panel for the head-mounted display device, according to another embodiment.

Unlike in FIG. 9, in FIG. 11, an encapsulation layer Encap2 formed to include three insulating layers is disposed on the Cathode instead of the encapsulation substrate Encap1, according to an embodiment.

In an embodiment, the encapsulation layer Encap2, which is a layer for blocking moisture and oxygen from flowing into the organic light emitting diode OLED, may have a structure including a plurality of insulating layers, and may be formed as a composite film including both an inorganic layer and an organic layer among them. FIG. 11 illustrates the encapsulation layer Encap2 according to an embodiment, and a first encapsulation inorganic layer Encap2-1, an encapsulation organic layer Encap2-2, and a second encapsulation inorganic layer Encap2-3 are sequentially formed as a triple layer.

In an embodiment, the first encapsulation inorganic layer Encap2-1 may cover the Cathode, and may include silicon nitride, silicon oxide, and/or an inorganic compound obtained by combining them.

In an embodiment, the encapsulation organic layer Encap2-2 may be disposed on the first encapsulation inorganic layer Encap2-1 to contact the first encapsulation inorganic layer Encap2-1. Curves positioned on an upper surface of the first encapsulation inorganic layer Encap2-1 or particles present on the first encapsulation inorganic layer Encap2-1 may be covered by the encapsulation organic layer Encap2-2 and may have a planarizing characteristic due to the encapsulation organic layer Encap2-2.

In an embodiment, the second encapsulation inorganic layer Encap2-3 is disposed on the encapsulation organic layer Encap2-2 to cover the encapsulation organic layer Encap2-2. The second encapsulation inorganic layer Encap2-3 may include silicon nitride, silicon oxide, and/or an inorganic compound obtained by combining them.

In the above, the embodiments in which all three retarders 130, 211, and 221 used have a forward wavelength dispersion characteristic to provide a phase delay of $\lambda/4$ with respect to the delay axis has been described. However, since all the retarders 130, 211, and 221 provide a phase delay of $\lambda/4$ light passing through the retarders 130, 211, and 221 several times accumulates, resulting in possibly undesirable polarization characteristics. (See FIG. 14). Accordingly, according to another embodiment, a phase delay of $-\lambda/4$ with respect to the delay axis may be provided so that at least one of the three retardation plates 130, 211, and 221 has a reverse wavelength dispersion characteristic.

Hereinafter, examples including the reverse wavelength dispersion characteristic will be described with reference to FIG. 12 and FIG. 13, according to an embodiment.

Figure 12:
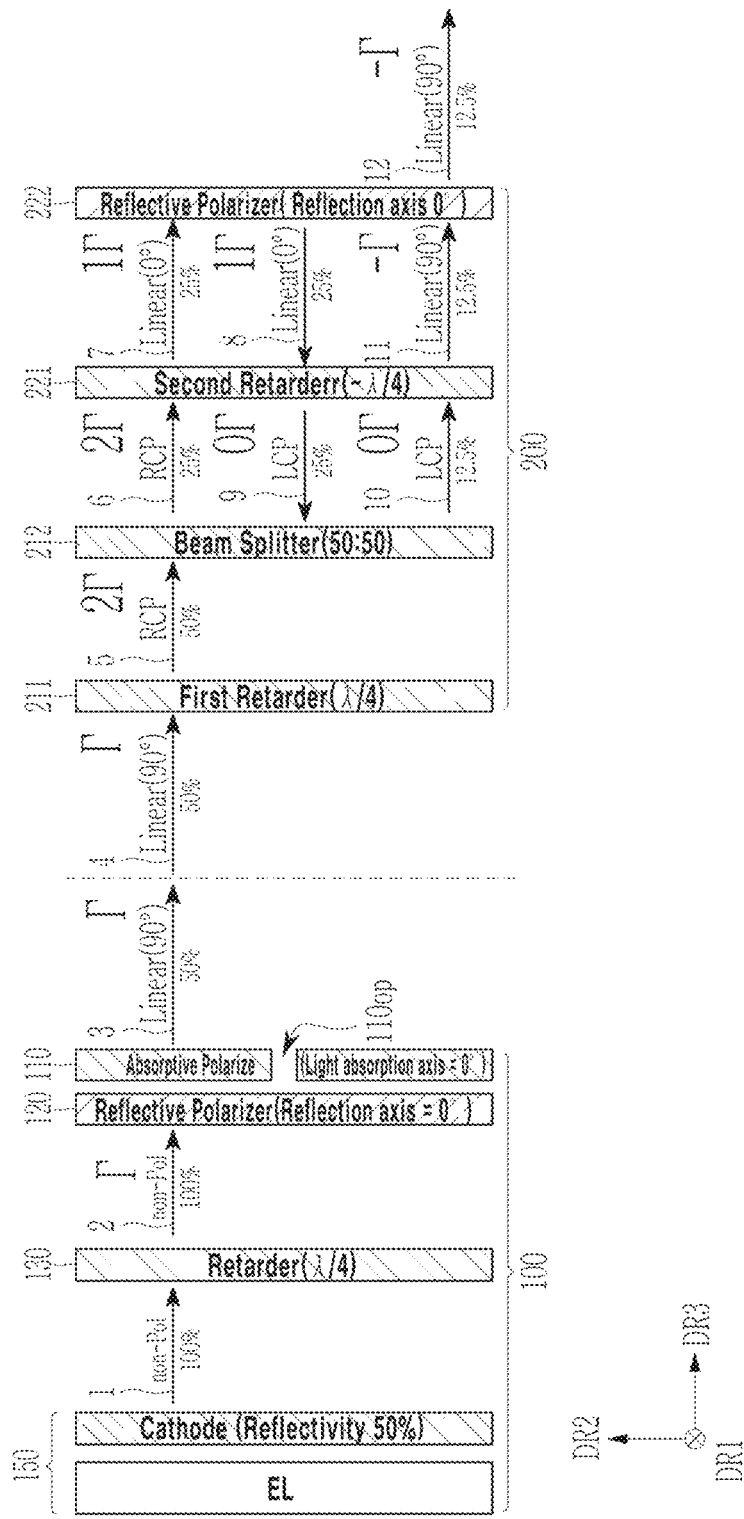
FIG. 12 illustrates an optical path and transmittance of a head-mounted display device, according to another embodiment.
Figure 13:
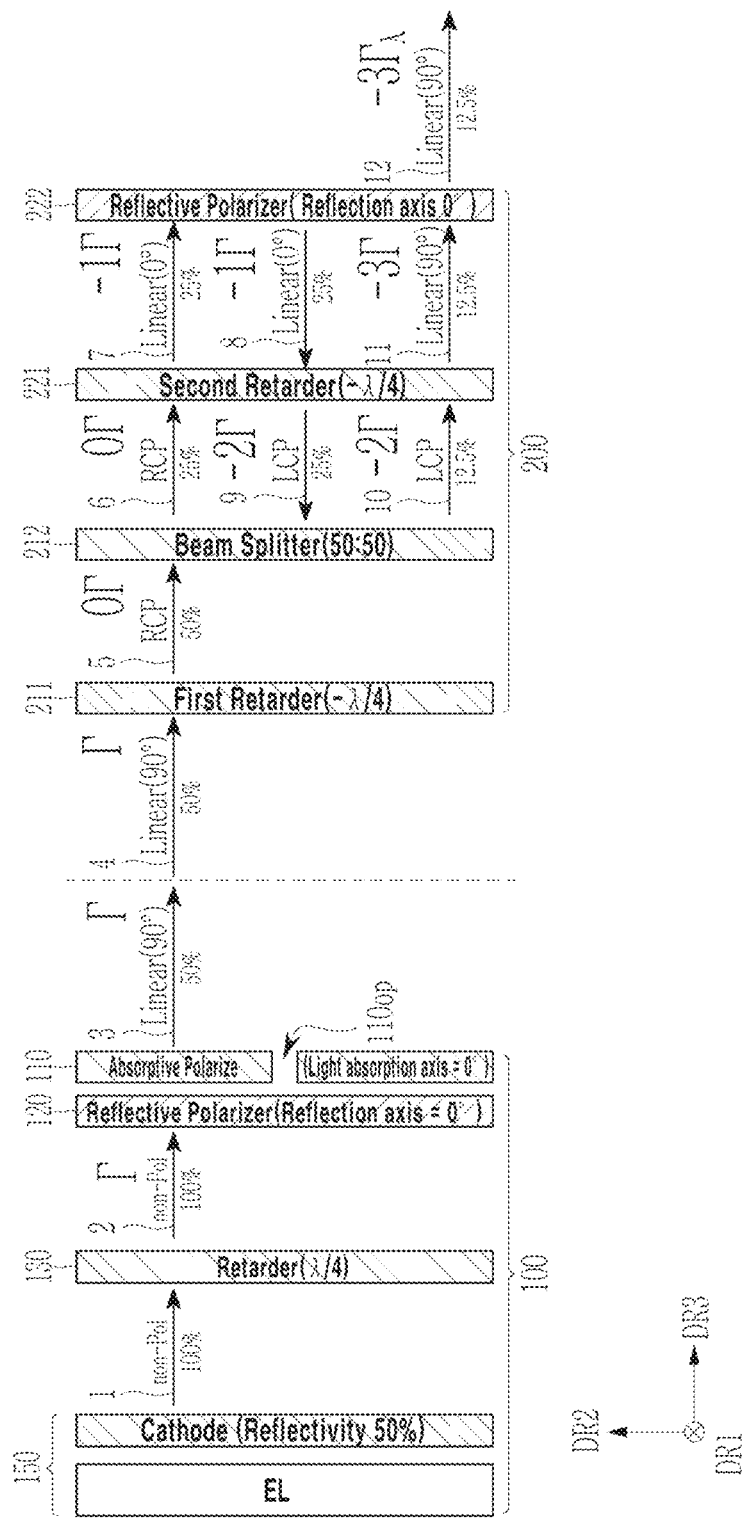
FIG. 13 illustrates an optical path and transmittance of a head-mounted display device, according to another embodiment.

FIG. 12 and FIG. 13 each illustrate an optical path and transmittance of the head-mounted display device, according to another embodiment.

Unlike in the embodiment of FIG. 2, in FIG. 12, an embodiment in which the second retarder 221 has a reverse wavelength dispersion characteristic providing a phase delay of $-\lambda/4$ with respect to the delay axis is shown, and in FIG. 13, an embodiment in which both the first retarder 211 and the second retarder 221 have a reverse wavelength dispersion characteristic providing a phase delay of $-\lambda/4$ with respect to the delay axis is shown.

Unlike in FIG. 5 to FIG. 8, in FIG. 12 and FIG. 13, while additionally showing gamma ($\Gamma$), one gamma ($\Gamma$) is added for a forward wavelength dispersion characteristic and one gamma ($\Gamma$) is subtracted for a reverse wavelength dispersion characteristic, according to an embodiment.

First, in addition to the optical path and transmittance shown in FIG. 12, wavelength dispersion will be described as follows.

In an embodiment, FIG. 12 further illustrates wavelength dispersion, and thus the wavelength dispersion will be mainly described as follows.

In an embodiment, light 3 is light provided from the display panel 100 to the optical system 200, and has one gamma ($\Gamma$) value because it passes through the retarder 130 once in the display panel 100 for the head-mounted display device.

In an embodiment, light 3 is 50% of light with 90° linearly polarized light and has one gamma ($\Gamma$) value, and referring to Light 5, 50% of light having 90° linearly polarized light transferred to the optical system 200 is changed to right-circularly polarized light RCP while passing through the first retarder 211 and transmits 50% of right-circularly polarized light RCP, and in this case, the wavelength dispersion has a 2$\Gamma$ value.

In an embodiment and referring to Light 6, while 50% of right-circularly polarized light RCP light passes through the beam splitter 212, half is transmitted, and thus 25% of right-circularly polarized light RCP is transferred in the third direction DR3. Since the beam splitter 212 does not provide a phase difference, Light 6 still has a wavelength dispersion value of 2$\Gamma$.

In an embodiment and referring to Light 7, the second retarder 221 changes right-circularly polarized light RCP into 0° linearly polarized light, to convert it to 25% of 0° linearly polarized light. In this case, the second retarder 221 provides reverse wavelength dispersion ($-\lambda/4$), and the wavelength dispersion of light transmitted through the second retarder 221 is reduced to $\Gamma$.

In an embodiment and referring to Light 8, the reflective polarizer 222 has a reflection axis of 0°, and thus all 0° light is reflected and transferred to the second retarder 221 again, so 25% of light having 0° linearly polarized light and the wavelength dispersion of $\Gamma$ is incident again to the second retarder 221.

In an embodiment and referring to Light 9, 25% of the light that is linearly polarized at 0° and has $\Gamma$ as wavelength dispersion is changed to left-circularly polarized light LCP as it passes through the second retarder 221, and is changed to 25% of left-circularly polarized light LCP, and has a wavelength dispersion value of 0 due to the reverse wavelength dispersion ($-\lambda/4$) of the second retarder 221.

In an embodiment and referring to Light 10, as 25% of left-circularly polarized light LCP is incident on the beam splitter 212, 12.5% of the light, which is half of the incident light, is reflected, and is reflected from the beam splitter 212 and transferred again in the third direction DR3 to be incident on the second retarder 221. In this case, a phase thereof may also maintain the left-circularly polarized light LCP.

In an embodiment and referring to Light 11, 12.5% of left-circularly polarized light LCP is changed to 90° linearly polarized light as it passes through the second retarder 221, and has a wavelength dispersion value of $-\Gamma$ due to the reverse wavelength dispersion ($\lambda/4$) of the second retarder 221.

In an embodiment and referring to Light 12, the reflective polarizer 222 has a reflection axis of 0° and a transmission axis of 0° perpendicular thereto, and thus all the 90° linearly polarized light is transmitted. Accordingly, 12.5% of 90° linearly polarized light, and light having a wavelength dispersion value of −Γ is transferred to the user's eyes.

Meanwhile, in addition to the optical path and transmittance shown in FIG. 13, wavelength dispersion will also be described as follows.

FIG. 13 also further illustrates wavelength dispersion, according to an embodiment, and thus the wavelength dispersion will be mainly described as follows.

In an embodiment, light 3 is light provided from the display panel 100 to the optical system 200, and has one gamma (Γ) value because it passes through the retarder plate 130 once in the display panel 100 for the head-mounted display device.

In an embodiment, light 3 is 50% of light with 90° linearly polarized light and has one gamma (Γ) value, and referring to Light 5, 50% of light having the 90° linearly polarized light transferred to the optical system 200 is changed to right-circularly polarized light RCP while passing through the first retarder 211 and transmits 50% of right-circularly polarized light RCP, the first retarder 211 provides reverse wavelength dispersion (−λ/4), and in this case, the wavelength dispersion has a 0Γ value.

In an embodiment and referring to Light 6, while 50% of right-circularly polarized (RCP) light passes through the beam splitter 212, half is transmitted, and thus 25% of right-circularly polarized (RCP) light is transferred in the third direction DR3. Since the beam splitter 212 does not provide a phase difference, Light 6 still has a wavelength dispersion value of 0Γ.

In an embodiment and referring to Light 7, the second retarder 221 changes right-circularly polarized light RCP into 0° linearly polarized light, to convert it to 25% of 0° linearly polarized light. In this embodiment, the second retarder 221 provides reverse wavelength dispersion (−λ/4), the wavelength dispersion of light transmitted through the second retarder 221 is reduced to −Γ.

In an embodiment and referring to Light 8, the reflective polarizer 222 has a reflection axis of 0°, and thus all 0° light is reflected and transferred to the second retarder 221 again, so 25% of light having 0° linearly polarized light and the wavelength dispersion of −Γ is incident again to the second retarder 221.

In an embodiment and referring to Light 9, 25% of the light that is linearly polarized at 0° and has −Γ as wavelength dispersion is changed to left-circularly polarized light LCP as it passes through the second retarder 221, and is changed to 25% of left-circularly polarized light LCP, and has a wavelength dispersion value of −2Γ due to the reverse wavelength dispersion (−λ/4) of the second retarder 221.

In an embodiment and referring to Light 10, as 25% of left-circularly polarized light LCP is incident to the beam splitter 212, 12.5% of the light, which is half of the incident light, is reflected, and is reflected from the beam splitter 212 and transferred again in the third direction DR3 to be incident on the second retarder 221. In this case, a phase thereof may also maintain the left-circularly polarized light LCP.

In an embodiment and referring to Light 11, 12.5% of left-circularly polarized light LCP is changed to 90° linearly polarized light as it passes through the second retarder 221, and has a wavelength dispersion value of −3Γ due to the reverse wavelength dispersion (−λ/4) of the second retarder 221.

In an embodiment and referring to Light 12, the reflective polarizer 222 has a reflection axis of 0° and a transmission axis of 0° perpendicular thereto, and thus all the 90° linearly polarized light is transmitted. Accordingly, 12.5% of 90° linearly polarized light, and light having a wavelength dispersion value of −3Γ is transferred to the user's eyes.

In the above, as in FIG. 12 and FIG. 13, wavelength dispersion in which one of the first retarder 211 and the second retarder 221 has a reverse wavelength dispersion characteristic has been described, according to an embodiment.

Hereinafter, a difference in wavelength dispersion from FIG. 12 and FIG. 13 will be described according to an embodiment in which both the first retarder 211 and the second retarder 221 have a forward wavelength dispersion characteristic with reference to FIG. 14.

Figure 14:
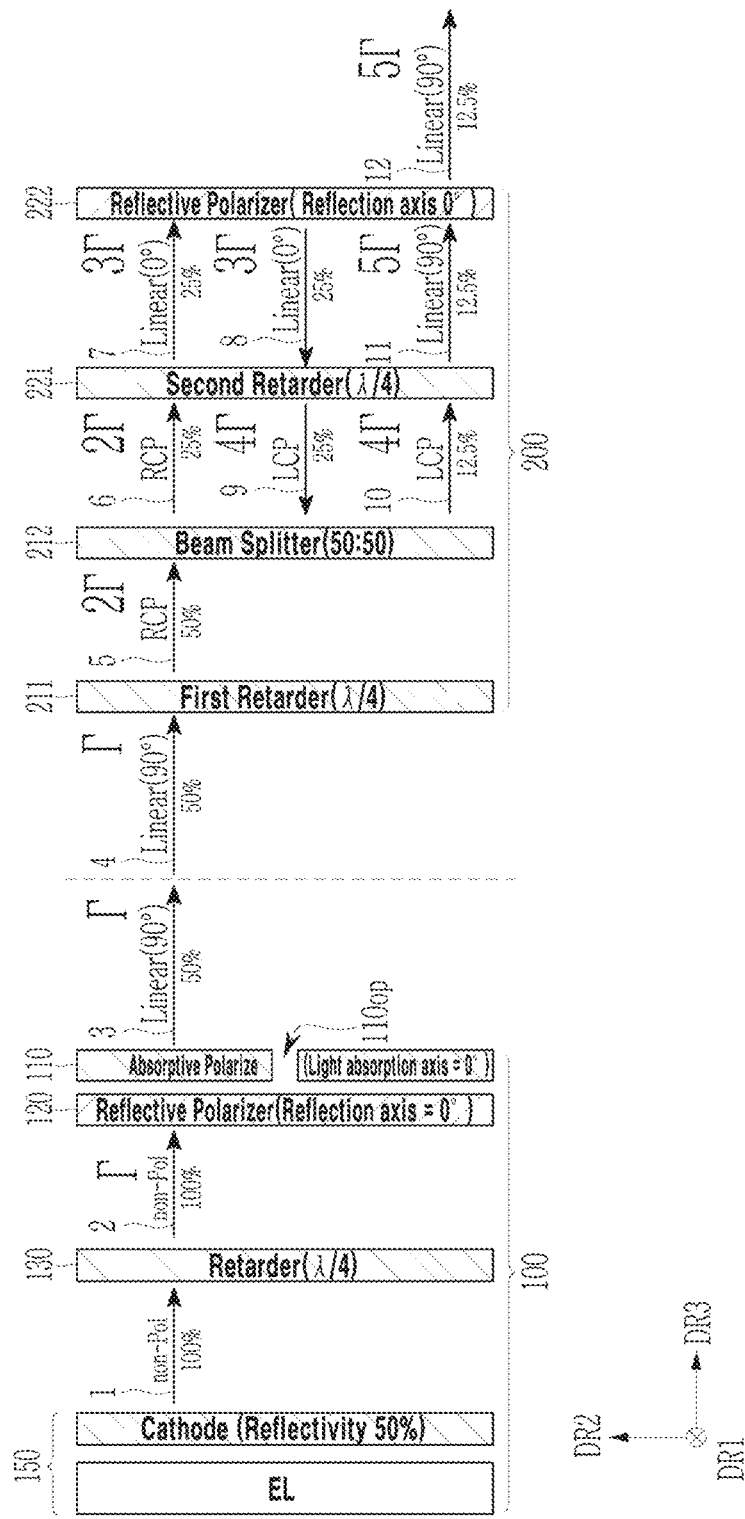
FIG. 14 illustrates comparative characteristics including a forward wavelength dispersion characteristic unlike in the embodiments of FIG. 12 and FIG. 13, according to an embodiment.

FIG. 14 illustrates comparative characteristics of an embodiment including a forward wavelength dispersion characteristic unlike in the embodiments of FIG. 12 and FIG. 13.

In an embodiment, FIG. 14 also further illustrates wavelength dispersion, and thus the wavelength dispersion will be mainly described as follows.

In an embodiment, light 3 is light provided from the display panel 100 to the optical system 200, and has one gamma (Γ) value because it passes through the retarder 130 once in the display panel 100 for the head-mounted display device.

In an embodiment, light 3 is 50% of light with 90° linearly polarized light and has one gamma (Γ) value, and referring to Light 5, 50% of light having the 90° linearly polarized light transferred to the optical system 200 is changed to right-circularly polarized light RCP while passing through the first retarder 211 and transmits 50% of right-circularly polarized light RCP, the first retarder 211 provides forward wavelength dispersion (λ/4), and in this case, the wavelength dispersion has a 2Γ value.

In an embodiment and referring to Light 6, while 50% of right-circularly polarized (RCP) light passes through the beam splitter 212, half is transmitted, and thus 25% of right-circularly polarized (RCP) light is transferred in the third direction DR3. Since the beam splitter 212 does not provide a phase difference, Light 6 still has a wavelength dispersion value of 2Γ.

In an embodiment and referring to Light 7, the second retarder 221 changes right-circularly polarized light RCP into 0° linearly polarized light, to convert it to 25% of 0° linearly polarized light. In this case, the second retarder 221 provides forward wavelength dispersion (λ/4), and the wavelength dispersion of light transmitted through the second retardation plate 221 is reduced to −Γ.

In an embodiment and referring to Light 8, the reflective polarizer 222 has a reflection axis of 0°, and thus all 0° light is reflected and transferred to the second retarder 221 again, so 25% of light having 0° linearly polarized light and the wavelength dispersion of 3Γ is incident again to the second retarder 221.

In an embodiment and referring to Light 9, 25% of the light that is linearly polarized at 0° and has 3Γ as wavelength dispersion is changed to left-circularly polarized light LCP as it passes through the second retarder 221, and is changed to 25% of left-circularly polarized light LCP, and has a wavelength dispersion value of 4Γ due to the forward wavelength dispersion (λ/4) of the second retarder 221.

In an embodiment and referring to Light 10, as 25% of left-circularly polarized light LCP is incident to the beam splitter 212, 12.5% of the light, which is half of the incident light, is reflected, and is reflected from the beam splitter 212 and transferred again in the third direction DR3 to be incident on the second retarder 221. In this case, a phase thereof may also maintain the left-circularly polarized light LCP.

In an embodiment and referring to Light 11, 12.5% of left-circularly polarized light LCP is changed to 90° linearly polarized light Linear as it passes through the second retarder 221, and has a wavelength dispersion value of 5Γ due to the forward wavelength dispersion (λ/4) of the second retarder 221.

In an embodiment and referring to Light 12, the reflective polarizer 222 has a reflection axis of 0° and a transmission axis of 0° perpendicular thereto, and thus all the 90° linearly polarized light Linear is transmitted. Accordingly, 12.5% of 90° linearly polarized light, and light having a wavelength dispersion value of 5Γ is transferred to the user's eyes.

In the embodiment of FIG. 14, light having a wavelength dispersion of 5Γ is provided to the user's eyes, but in the embodiment of FIG. 12, light having a wavelength dispersion of −1Γ is provided to the user's eyes, and in the embodiment of FIG. 13, light having a wavelength dispersion of −3Γ is provided to the user's eyes.

In an embodiment, the retarder provides different retardation according to the wavelength of light, and light passing through a plurality of retarders may have an undesirable polarization characteristic. Accordingly, as the wavelength dispersion (Γ) of light provided to the user's eyes approaches 0, it indicates that the polarization difference according to the wavelength is small. Therefore, in the case of the embodiment of FIG. 14, a difference from 0 is the largest, and thus there is a high possibility that the polarization characteristic of the light passing through the retarder through recycling is changed. In contrast, in the embodiments of FIG. 12 and FIG. 13, light having a wavelength dispersion (Γ) approaching 0 may be provided to the user's eyes by using a retarder having at least partial reverse wavelength dispersion, and thus even if it passes through the retarder through recycling many times, the possibility that the polarization characteristic of light is different from an intended direction is low, and more improved display quality may be provided.

In an embodiment, in the above head-mounted display device, the first curved lens 210 and the second curved lens 220 have cross-sectional shapes as illustrated in FIG. 1. However, according to an embodiment, the first curved lens 210 and the second curved lens 220 may have shapes different from those of FIG. 1. Hereinafter, shapes of the first curved lens 210 and the second curved lens 220 according to another embodiment will be described with reference to FIG. 15.

Figure 15:
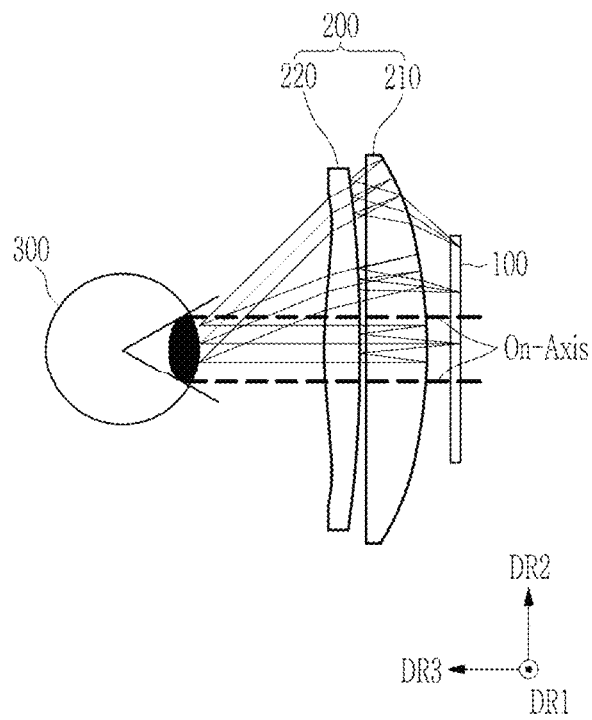
FIG. 15 illustrates a schematic cross-sectional view of a head-mounted display device, according to an embodiment.

FIG. 15 illustrates a schematic cross-sectional view of a head-mounted display device according to an embodiment.

According to an embodiment of FIG. 15, the first curved lens 210 and the second curved lens 220 do not have a constant thickness unlike in FIG. 1 and may have different thicknesses depending on their positions. In addition, cross-sectional shapes of the first curved lens 210 and the second curved lens 220 may be different from each other as illustrated in FIG. 15.

In the first curved lens 210 according to the embodiment of FIG. 15, a side of the first curved lens 210 adjacent the display panel 100 (in an opposite direction to the third direction DR3, hereinafter also referred to as an inner side) may be formed as a curved surface, and an outer side (a side in the third direction DR3) may be formed as a flat surface.

In the second curved lens 220 according to the embodiment of FIG. 15, the side of second curved lens 220 adjacent the display panel 100 (in the opposite direction to the third direction DR3 hereinafter also referred to as the inner side) may be formed as a curved surface, but the outer side may be formed as a flat curved surface rather than an inner curved surface of the first curved lens 210, and surfaces having different curvatures may be connected to the outer side (the side in the third direction DR3) of the second curved lens 220. That is, a central portion of the outer side (the side in the third direction DR3) of the second curved lens 220 may have a convex structure protruding in the third direction DR3, and a portion in the convex structure may be included in a periphery where a width of a cross-section is widened. A region having a constant cross-section width may be included in an outermost region of the second curved lens 220.

In the embodiment of FIG. 15, the first retarder 211, the beam splitter 212, the second retarder 221, and the reflective polarizer 222 attached to the first curved lens 210 and the second curved lens 220 are not illustrated, but as illustrated in FIG. 1, the first retarder 211 is formed at a side of the display panel 100 of the first curved lens 210 (in the opposite direction to the third direction DR3, hereinafter also referred to as the inner side), the beam splitter 212 is formed at the outside (the side in the third direction DR3), the second retarder 221 is formed inside the second curved lens 220 (in the opposite direction to the third direction DR3), and the reflective polarizer 222 is formed at an outer side (the side in the third direction DR3).

In an embodiment, an optical path may be the same as that of FIG. 15, and as a result, the display panel 100 may appear wider than a size of the display panel 100 to improve immersion or a three-dimensional effect. Since there is one pair of eyes 300 of a user, one pair of structures illustrated in FIG. 15 may exist in one head-mounted display device.

In the embodiment of FIG. 15, the display panel 100 may have a structure as illustrated in FIG. 2 and FIG. 3, and the absorptive polarizer 110 positioned on the display panel 100 may also include the open portion 110op.

Hereinafter, the head-mounted display device, according to another embodiment, will be described with reference to FIG. 16 to FIG. 20, and light emitted from the display panel 100 included in the head-mounted display device of FIG. 16 to FIG. 20 has a feature of emitting circularly polarized light without a separate retarder.

Figure 16:
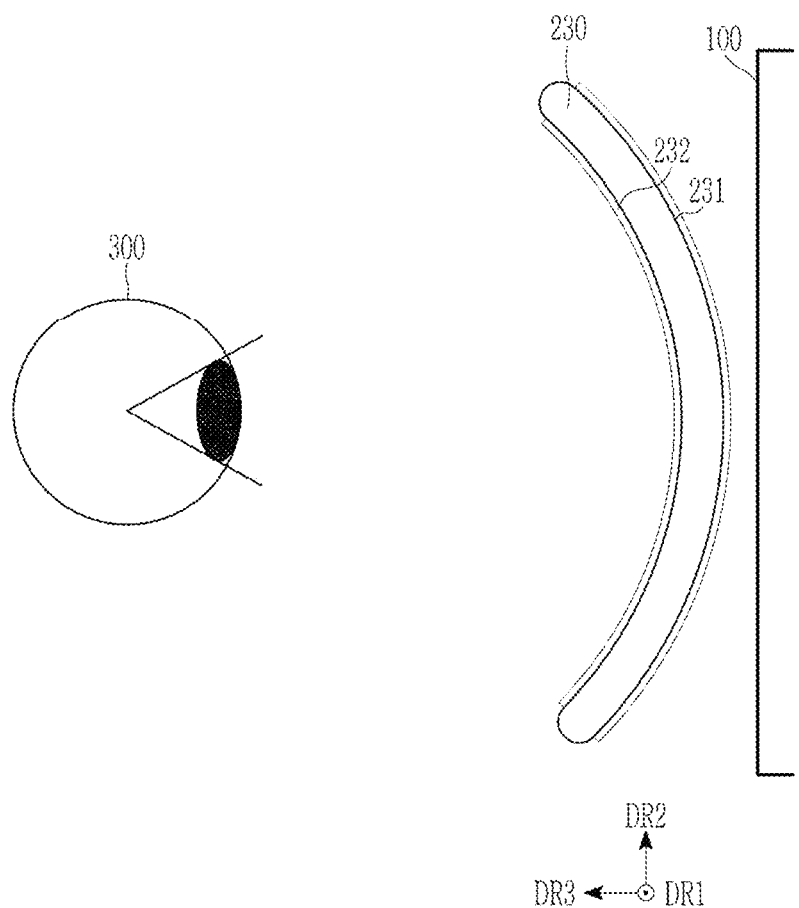
FIG. 16 illustrates a schematic cross-sectional view of a head-mounted display device, according to another embodiment.

In an embodiment, if the display panel 100 for the head-mounted display device emits circularly polarized light without a retarder, it may include one curved lens 230 (pancake lens) as illustrated in FIG. 16.

Hereinafter, another head-mounted display device will be described in detail with reference to FIG. 16.

FIG. 16 illustrates a schematic cross-sectional view of a head-mounted display device, according to another embodiment.

In an embodiment, a head-mounted display device according to FIG. 16 roughly includes a display panel 100 (hereinafter also referred to as a display panel for a head-mounted display device) and an optical system positioned in front of the display panel 100. Herein, light emitted from the light emitting element unit of the display panel 100 for the head-mounted display device may emit circularly polarized light without a separate retarder, and an optical system may include one curved lens 230 (hereinafter referred to as a pancake lens). In addition, since optical films 231 and 232 are positioned on opposite surfaces of the one curved lens 230, a number of optical films included in the optical system may be reduced by half compared to the embodiment of FIG. 1.

First, the optical system according to the embodiment will be described in detail with reference to FIG. 16 as follows.

In an embodiment, the retarder 231 (hereinafter also referred to as an optical retarder) is formed at a side of the display panel 100 of the one curved lens 230 (hereinafter referred to as a pancake lens) included in the optical system (in an opposite direction to the third direction DR3, also referred to as an inner side), and a reflective polarizer 232 (hereinafter also referred to as an optical system reflective polarizer) is formed at an outer side (in the third direction DR3) of the one curved lens 230.

In an embodiment, the retarder 231 is also referred to as a λ/4 plate, and may change linearly polarized light into circularly polarized light or circularly polarized light into linearly polarized light by providing a retardation of λ/4 with respect to a delay axis. The reflective polarizer 232 has a reflection axis, and reflects linearly polarized light on the reflection axis, and transmits linearly polarized light perpendicular to the reflection axis. The reflective polarizer 232 may have a wire grid structure in which a plurality of metal lines having fine widths are arranged in one direction and may reflect light parallel to an arrangement direction of the metal lines and may transmit light perpendicular thereto. In this case, an interval between the metal lines may be narrower than a wavelength of visible light.

In an embodiment, the curved lens 230 included in the optical system may be formed of an optically isotropic material—for example, glass—or a curved surface of the curved lens 230 may be formed of a spherical surface or an aspherical surface. It may be formed of polymethyl methacrylate and/or the like. According to an embodiment, the curved lens 230 may have a cross-sectional shape different from that of FIG. 16.

Unlike in FIG. 2, the display panel 100 for the head-mounted display included in the embodiment of FIG. 16 may not include separate optical films (absorptive polarizer 110, reflective polarizer 120, retarder 130, etc. in FIG. 2) formed on a front surface of the cathode.

In an embodiment, since there is one pair of eyes 300 of a user, one pair of structures illustrated in FIG. 16 may exist in the head-mounted display device.

Hereinafter, an optical path and transmittance of the entire head-mounted display device will be described with reference to FIG. 17.

Figure 17:
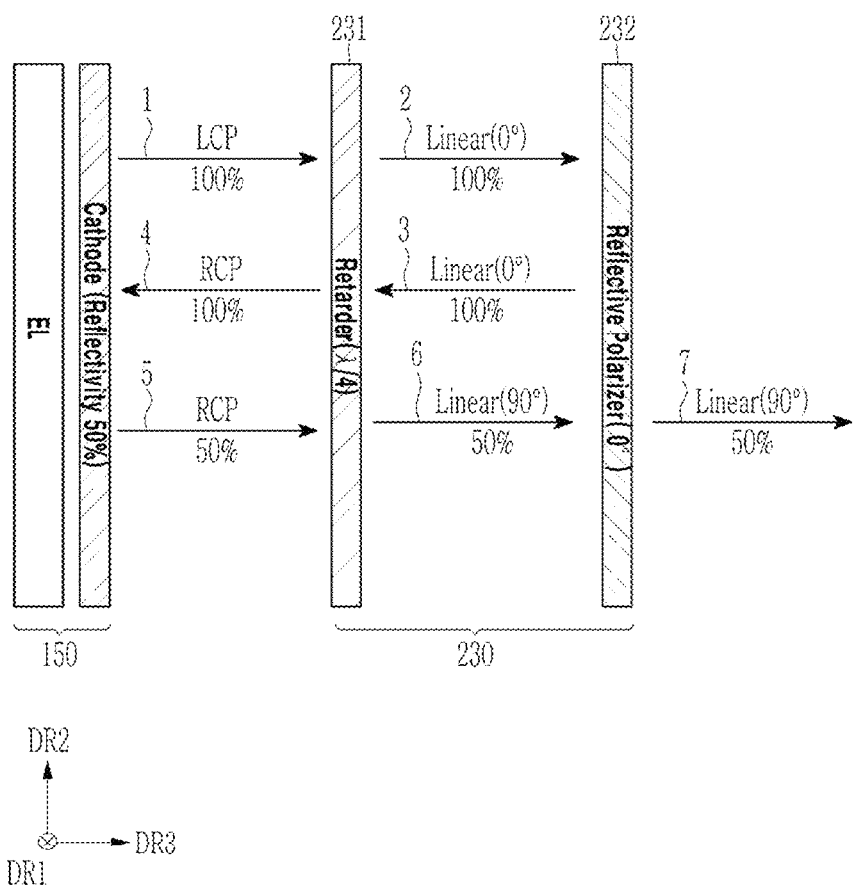
FIG. 17 illustrates an optical path and transmittance of the head-mounted display device of FIG. 16, according to an embodiment.

FIG. 17 illustrates an optical path and transmittance of the head-mounted display device, according to an embodiment.

Figure 18:
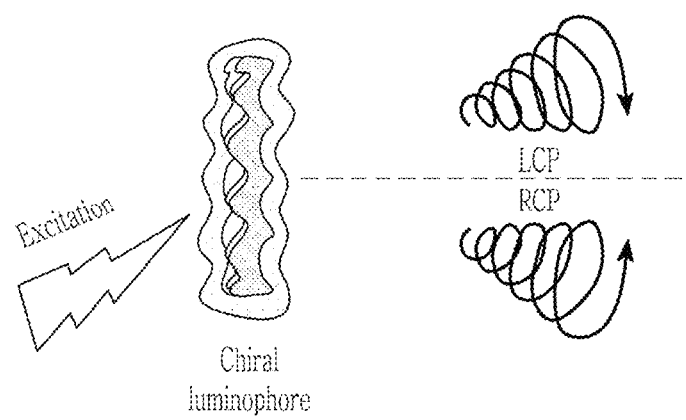
FIG. 18 illustrates a detailed view of an example of an emission layer of a display panel for the head-mounted display device of FIG. 16, according to an embodiment.
Figure 19:
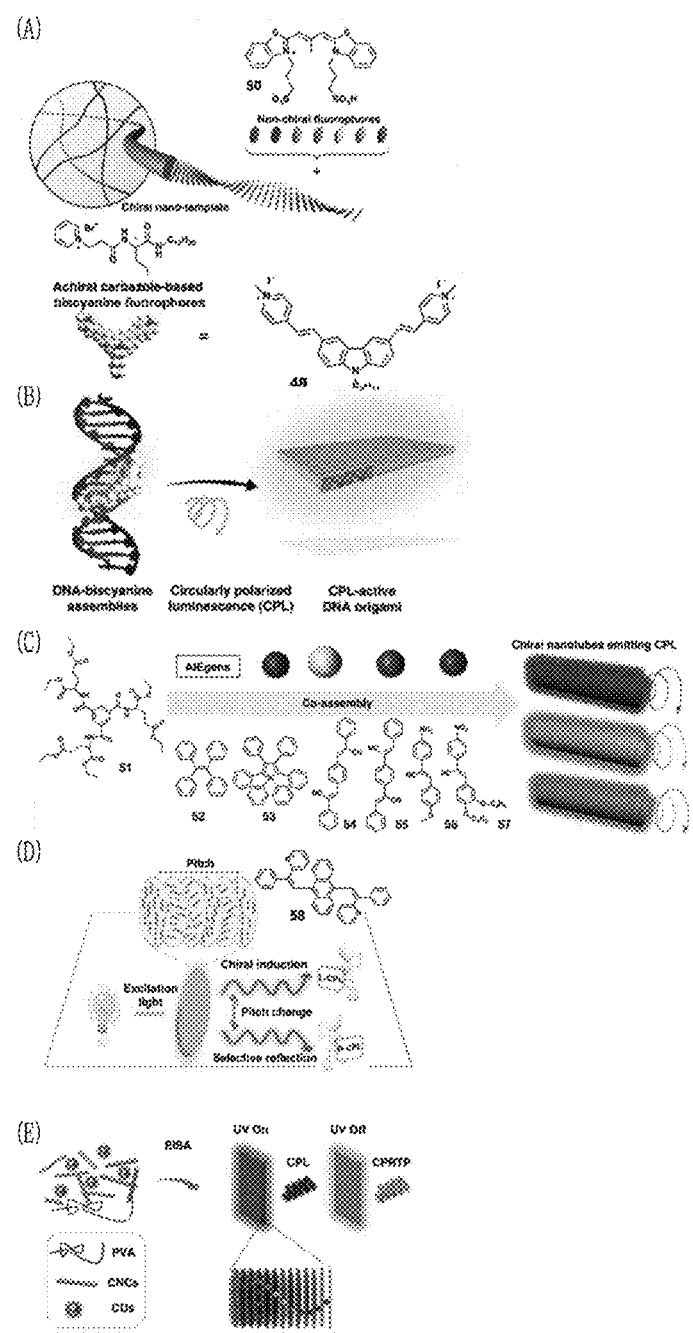
FIG. 19 illustrates a detailed view of an example of an emission layer of a display panel for the head-mounted display device of FIG. 16, according to an embodiment.

In an embodiment and as illustrated in FIG. 17, in the display panel 100 for the head-mounted display device, a separate film is not formed on the cathode of the light emitting element unit 150. However, as illustrated in FIG. 18 and FIG. 19, an emission layer of a light emitting diode may include a material that emits either left-circularly polarized light LCP or right-circularly polarized light RCP, one of which may include a material of a chiral luminophore or a light emitting material of a helix structure, may emit circularly polarized light through a birefringent method, or may be formed in one of various methods illustrated in FIG. 19.

In an embodiment and referring to Light 1 of FIG. 17, a light emitting diode of the display panel 100 for a head-mounted display device emits left-circularly polarized light LCP without a separate optical film. As a result, 100% of light is emitted from the display panel 100 for the head-mounted display device without light loss and is incident to the optical system.

In an embodiment and referring to Light 2, the retarder 231 changes left-circularly polarized light LCP into 0° linearly polarized light, to convert it to 100% of 0° linearly polarized light.

In an embodiment and referring to Light 3, the reflective polarizer 232 has a reflection axis of 0°, and all of the 0° light is reflected and transferred to the retarder 231 again.

In an embodiment and referring to Light 4, 100% of the 0° linearly polarized light is changed to right-circularly polarized light RCP while passing through the retarder 231, and thus 100% of the right-circularly polarized light RCP is incident on the Cathode again.

In an embodiment and referring to Light 5, the cathode reflects half of the incident light, and 50% of the light is transferred in the third direction DR3, and in this, the polarization characteristic may maintain the right-circularly polarized light RCP.

In an embodiment and referring to Light 6, 50% of the right-circularly polarized light RCP is changed to 90° linearly polarized light Linear while passing through the retarder 231.

In an embodiment and referring to Light 7, the reflective polarizer 232 has a reflection axis of 0° and a transmission axis of 90° perpendicular thereto, and thus all the 90° linearly polarized light Linear is transmitted. Accordingly, 50% of the 90° linearly polarized light is transmitted to the user's eyes.

In an embodiment and referring to FIG. 17, 50% of the light emitted from the light emitting diode of the display panel 100 for the head-mounted display device is transmitted to the user's eyes, and thus it can be confirmed that the display panel 100 has very high light efficiency.

In an embodiment on the other hand, in FIG. 17, as shown in the light emitting element unit 150 of FIG. 5, half (50%) of the Light 4 incident from the Cathode is reflected back from the Anode to be recycled while passing through the Cathode again, and in FIG. 17, related descriptions are omitted. According to recycling of light in the light emitting element unit 150, the amount of Light 5 traveling in the third direction DR3 from the cathode may be increased more than the percentage illustrated in FIG. 17.

In addition, in an embodiment, the optical system uses one retarder 231 and includes two optical films (the retarder 231 and the reflective polarizer 232), and it can be confirmed that the display panel 100 for the head-mounted display device has high light efficiency because a separate optical film is not used.

In addition, in an embodiment, the weight of the head-mounted display device is light, so the user does not feel tired even when using it for a long time.

Hereinafter, in an embodiment, a structure of an emission layer capable of emitting circularly polarized light in the display panel 100 for the head-mounted display device will be schematically described with reference to FIG. 18 and FIG. 19.

FIG. 18 and FIG. 19 each illustrate detailed views of an example of an emission layer of the display panel for the head-mounted display device according to the embodiment of FIG. 16.

In an embodiment and referring to FIG. 18, the emission layer may emit light using a material included in a chiral luminophore to emit either left-circularly polarized light LCP or right-circularly polarized light RCP.

FIG. 19 illustrates an embodiment of five emission layers.

In an embodiment, FIG. 19(A) illustrates that an emission layer material can be formed by including fluorophores having no chiral structure in a nano-template having a chiral structure.

In an embodiment, FIG. 19(B) illustrates a method of coupling a circularly polarized light emitter (CPL) to a DNA structure, and FIG. 19(C) shows a method of emitting circularly polarized light by forming a chiral nanotube by adding AIEgens, which is a biomaterial.

In an embodiment, FIG. 19(D) illustrates a method in which circularly polarized light is generated while allowing light to be transmitted through a material in which a plurality of layers are stacked with a certain pitch, and FIG. 19(E) illustrates a method of emitting circularly polarized light using ultraviolet (UV) by adding polyvinyl alcohol (PVA), cellulose nanocrystal (CNC), and carbon dots (CD).

The method shown in FIG. 19 is one embodiment of various methods, and the invention is not limited thereto.

In an embodiment, in the above head-mounted display device, the curved lens 230 has a cross-sectional shape as illustrated in FIG. 16. However, according to another embodiment, the curved lens 230 may have a different shape from that of FIG. 16. Hereinafter, a shape of the curved lens 230 according to still another embodiment will be described in FIG. 20.

Figure 20:
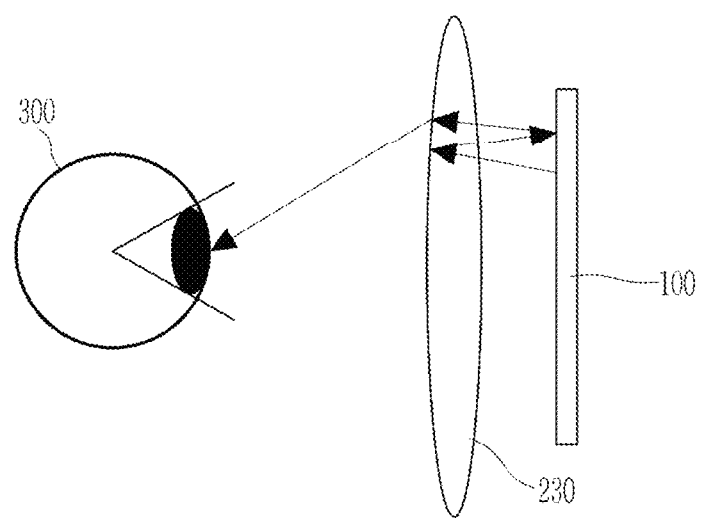
FIG. 20 illustrates a schematic cross-sectional view of the head-mounted display device of FIG. 16, according to an embodiment.

FIG. 20 illustrates a schematic cross-sectional view of a head-mounted display device according to an embodiment.

According to an embodiment, the curved lens 230 does not have a constant thickness unlike in FIG. 16 and may have different thicknesses depending on its positions.

In an embodiment, opposite sides of the curved lens 230 are formed as convex curved surfaces.

In an embodiment, the retarder 231 and the reflective polarizer 232 attached to the curved lens 230 are not illustrated, but as illustrated in FIG. 16, the retarder 231 is formed at an inner side of the display panel 100 of the curved lens 230 (an opposite direction to the third direction DR3), and the reflective polarizer 232 is formed at an outer side (a side in the third direction DR3).

According to an embodiment, an optical path may be the same as that of FIG. 20, and as a result, the display panel 100 may appear wider than a size of the display panel 100 to improve immersion or a three-dimensional effect. Since there is one pair of eyes 300 of a user, one pair of structures illustrated in FIG. 20 may exist in the head-mounted display device.

While this disclosure has been described in connection with what are presently considered to be practical embodiments, it should be understood that the invention is not limited to the disclosed embodiments, but, on the contrary, is intended to cover various modifications and equivalent arrangements included within the spirit and scope of the appended claims.

What is claimed is:

1. A head-mounted display device comprising:
   a display panel; and
   an optical system positioned on a front surface of the display panel,
   wherein the display panel,
   sequentially includes a light emitting element unit, a retarder positioned on a front surface of the light emitting element unit, a reflective polarizer, and an absorptive polarizer,
   wherein the optical system includes:
   a first curved lens configured to include a first retarder positioned on an inner surface and a beam splitter positioned on an outer surface; and
   a second curved lens configured to include a second retarder positioned on an inner surface and a reflective polarizer positioned on an outer surface,
   wherein the first curved lens is positioned on the display panel, and the second curved lens is positioned on the first curved lens, and
   wherein the absorptive polarizer of the display panel includes an open portion from which the absorptive polarizer is removed.

2. The head-mounted display device of claim 1, wherein the open portion of the absorptive polarizer has an area of about 1/10 or more and about 1/5 or less of a total area of the absorptive polarizer or an area of the display panel.

3. The head-mounted display device of claim 2, wherein a central axis of the first curved lens or the second curved lens extends through the open portion and an eye of the user.

4. The head-mounted display device of claim 3, wherein when a region formed by extending a boundary line of the open portion in a direction parallel to the central axis is referred to as an open portion corresponding region, at least one portion of the eye of the user is positioned within the open portion corresponding region.

5. The head-mounted display device of claim 4, wherein a boundary line of the open portion corresponding region has an angle that is greater than about 0 degrees and less than about 5 degrees with respect to the central axis at a position of the eye of the user.

6. The head-mounted display device of claim 1, wherein the reflective polarizer of the display panel has a first reflection axis, and reflects polarized light of the first reflection axis, and transmits polarized light in a direction perpendicular to the first reflection axis, and the absorptive polarizer of the display panel has a light absorption axis, and absorbs polarized light of the light absorption axis, and transmits polarized light in a direction perpendicular to the light absorption axis.

7. The head-mounted display device of claim 6, wherein the retarder has a first delay axis, and delays light in a direction of the first delay axis by $\lambda/4$ to change linearly polarized light into circularly polarized light or circularly polarized light into linearly polarized light, where $\lambda$ is a wavelength of the linearly polarized light.

8. The head-mounted display device of claim 7, wherein the light absorption axis and the first reflection axis have the same direction.

9. The head-mounted display device of claim 8, wherein the reflective polarizer of the second curved lens has a second reflection axis, and reflects polarized light of the second reflection axis, and transmits polarized light in a direction perpendicular to the second reflection axis.

10. The head-mounted display device of claim 9, wherein the first retarder of the first curved lens has a second delay axis, and delays light in a direction of the second delay axis by $\lambda/4$ to change linearly polarized light into circularly polarized light or circularly polarized light into linearly polarized light, and the second retarder of the second curved lens has a third delay axis, and delays light in a direction of the third delay axis by $\lambda/4$ to change linearly polarized light into circularly polarized light or circularly polarized light into linearly polarized light, where $\lambda$ is a wavelength of the linearly polarized light.

11. The head-mounted display device of claim 10, wherein the second reflection axis has the same angle as that of the light absorption axis and the first reflection axis.

12. The head-mounted display device of claim 11, wherein
the first delay axis, the second delay axis, and the third delay axis have an angle of 45 degrees with respect to the light absorption axis and the first reflection axis.

13. The head-mounted display device of claim 11, wherein
at least one of the retarder, the first retarder, or the second retarder has a reverse wavelength dispersion characteristic.

14. The head-mounted display device of claim 13, wherein
the second retarder has the reverse wavelength dispersion characteristic, and
the first retarder has a forward wavelength dispersion characteristic.

15. The head-mounted display device of claim 13, wherein
the second retarder and the first retarder have the reverse wavelength dispersion characteristic.

16. The head-mounted display device of claim 12, wherein
the beam splitter of the first curved lens reflects a first half of incident light and transmits a second half of the incident light.

17. The head-mounted display device of claim 16, wherein
the light emitting element unit includes an anode, an intermediate layer including an emission layer, and a cathode,
wherein the cathode reflects half of light that is incident from a front side.

18. The head-mounted display device of claim 17, wherein
the display panel further includes an encapsulation substrate configured to block inflow of moisture or air into the emission layer, and
wherein the encapsulation substrate is positioned above the cathode.

19. The head-mounted display device of claim 18, wherein
the encapsulation substrate is in contact with at least one of the retarder, the reflective polarizer of the display panel, or the absorptive polarizer.

20. The head-mounted display device of claim 17, wherein
the display panel further includes an encapsulation layer configured to block inflow of moisture or air into the emission layer, and
wherein the encapsulation layer includes a first encapsulation inorganic layer and a second encapsulation inorganic layer, which are two inorganic encapsulation layers, and an encapsulation organic layer, which is an organic encapsulation layer, and
wherein the first encapsulation inorganic layer, the encapsulation organic layer, and the second encapsulation inorganic layer are sequentially stacked.

* * * * *